United States Patent [19]

Iimori

[11] Patent Number: 5,949,553
[45] Date of Patent: Sep. 7, 1999

[54] IMAGE FORMING APPARATUS HAVING REMOTE MAINTENANCE FUNCTION AND METHOD OF REMOTE MAINTENANCE

[75] Inventor: Akiro Iimori, Yokohama, Japan

[73] Assignee: Kabushiki Kaisha Toshiba, Kawasaki, Japan

[21] Appl. No.: 08/712,377

[22] Filed: Sep. 11, 1996

[30] Foreign Application Priority Data

Dec. 28, 1995 [JP] Japan .................................. 7-352152

[51] Int. Cl.⁶ .................................................. G03G 21/00
[52] U.S. Cl. ............................... 358/444; 358/439; 399/8
[58] Field of Search .................................... 358/439, 400, 358/404, 434, 435, 437, 438, 442, 443, 444; 395/113, 114, 112, 101; 399/8, 9, 10, 11

[56] References Cited

U.S. PATENT DOCUMENTS

| 5,084,875 | 1/1992 | Weinberger et al. | 371/291 |
| 5,200,958 | 4/1993 | Hamilton et al. | 371/16.4 |
| 5,325,152 | 6/1994 | Higashio et al. | 355/202 |
| 5,325,156 | 6/1994 | Ulinski | 355/209 |
| 5,365,310 | 11/1994 | Jenkins et al. | 355/202 |
| 5,373,349 | 12/1994 | Ito | 355/202 |
| 5,446,522 | 8/1995 | Tahara et al. | 399/8 |
| 5,504,590 | 4/1996 | Kawada et al. | 358/403 |
| 5,699,546 | 12/1997 | Nishikata et al. | 711/103 |

FOREIGN PATENT DOCUMENTS

| 59-188662 | 10/1984 | Japan . |
| 2-238470 | 9/1990 | Japan . |
| 5-053542 | 3/1993 | Japan . |

OTHER PUBLICATIONS

European Search Report.

Primary Examiner—Edward L. Coles
Assistant Examiner—Joseph R. Pokrzywa
Attorney, Agent, or Firm—Foley & Lardner

[57] ABSTRACT

An image forming apparatus in which the operating program can be changed even after the apparatus is delivered to the customer to perform the control meeting the prevailing status of the apparatus. An image of an original is read and formed by a mechanism, the status of the image forming apparatus is detected by a sensor, a first program for controlling the image forming mechanism is stored in a memory, a second program for controlling the apparatus according to the detected status is requested by a mechanism, the second program is received by and stored in a memory according to the request, and the image forming apparatus is controlled by a mechanism in accordance with the first and second programs.

5 Claims, 19 Drawing Sheets

IMAGE FORMING APPARATUS HAVING REMOTE MAINTENANCE FUNCTION AND METHOD OF REMOTE MAINTENANCE

BACKGROUND OF THE INVENTION

1. Field of the Invention

The present invention relates to an image forming apparatus capable of remote maintenance of an electronic copier for reading and printing an original image on paper, in which the maintenance program or the like can be modified after shipment of the apparatus, and relates to a method of remote maintenance of an image forming apparatus.

2. Description of the Related Art

In an image forming apparatus such as an electronic copier, an original placed on an original glass (original rest) is irradiated with an exposure lamp, and a latent image corresponding to the original is formed on a photosensitive drum by the light reflected in the exposure process. The latent image is developed by a toner in a developing unit, and a toner image thus developed is transferred onto the paper using a transfer unit. After that, the toner image on the paper is fixed using a fixing unit.

It is well known that an image forming apparatus is composed of many mechanical parts and chemical materials, which are consumed and the properties thereof steadily deteriorated by repeated operations. Typical examples are a paper feed roller, a photosensitive drum, a developing material, a fixing roller and a fixing silicon roller.

In order to maintain the image forming apparatus in a superior operating condition, it is important to change these parts at an appropriate time before the properties thereof are so deteriorated that the image forming apparatus comes to malfunction. For this purpose, various techniques have been incorporated in the conventional image forming apparatuses.

A first method is to install a counter on an image forming apparatus for counting the number of operations performed by the image forming apparatus. This method is intended to detect the number of operations of the image forming apparatus by the operation counter and thereby allow the photosensitive drum, the developing material, the fixing roller, etc. which is considered to operate the same number of times as the image forming apparatus proper to be replaced before reaching their service life. This method, however, has the disadvantage of low maintenance efficiency in that unless the person in charge of maintenance actually checks the counter at the installation site of the image forming apparatus, the time of replacement cannot be determined. The methods described below have been proposed for obviating this problem.

A second method is to monitor the number of operations of the image forming apparatus from a remote computer through a telephone line or a data bus line. This method makes it possible for the maintenance person to check the operation counters of a multiplicity of image forming apparatuses in sedentary fashion. It has thus become possible for the maintenance person to attend an image forming apparatus only when required to replace predetermined parts. In spite of this, this method has a problem, and various suggestions have been made to solve the problem. A typical problem is encountered in checking the service life of the paper feed roller and the number of operating errors. Specifically, in the case of an image forming apparatus having a plurality of paper feed means, the number of operations of the operation counter fails to coincide with that of the paper feed roller. A method to overcome this problem is described below.

A third method is to install a paper feed counter capable of performing and monitoring the operation of incrementing the count each time paper is fed from each paper feed means. This has made it possible to grasp the consumption of each paper feed roller accurately. Nevertheless, a succession of problems have henceforth have arisen.

As the wear of the silicon roller progresses, for example, silicon oil is supplied in a lesser amount and the jamming rate in the fixing unit increases. Field study shows that silicon oil is consumed earlier for some users than for others, i.e., before the number of operations generally considered normal. The reason is unknown, and the result is often an increased jamming rate in the fixing unit. It is difficult to monitor this situation simply by the number of normal operations. In an attempt to meet this adverse situation, the following-described method has been proposed.

A fourth method is for a counter to increment the count according to a predetermined error code each time an operating error occurs, and to monitor the count.

This has made it possible to grasp the wear of the fixing silicon controller.

As described above, various improvement efforts have hitherto been made in order to secure an accurate and effective method for conducting preventive maintenance of an image forming apparatus.

Nevertheless, a completely satisfactory preventive maintenance technique has yet to be established for the image forming apparatuses. This is attributable to the fact that the image forming apparatus is made up of mechanical and chemical parts and materials having wear and fatigue characteristics which are still clouded by many unknown facts.

More specifically, the following problems still remain to be solved.

First, the conventional fixing silicon roller has so far been considered to consume oil only when the fixing unit actually operates and the roller functions to discharge silicon oil. The silicon oil consumption by vaporization and hence the deterioration of the silicon roller characteristics, therefore, has been considered negligibly small while the fixing unit is allowed to stand. It has become apparent, however, that this vaporization phenomenon is not to be neglected even for the users who rarely operate the image forming apparatus and that the causes of oil vaporization from the apparatus in waiting mode must be evaluated and calculated more positively as a parameter for sensing the characteristic deterioration of the parts.

A specific machine allowed to stand for an hour has been found to vaporize as much oil as would be consumed for producing about five copies on the average.

Secondly, the surface of the conventional fixing rollers is known to wear as it is rubbed by a pawl or the like while in rotation. It has so far been considered that this phenomenon is the primary cause of the deterioration of the fixing roller and the other factors can be virtually ignored.

A fact-finding survey of the market, however, has revealed that the fixing roller of the image forming apparatus installed in the premises of infrequent users is deteriorated in proportion to the length of time the fixing roller is allowed to stand in wait mode rather than by reason of the surface wear caused by the friction described above. This is due to the fact that since the fixing roller is left to stand for a long time in high-temperature wait mode, the adhesive used for joining the aluminum stock tube of the fixing roller with the teflon material coating the fixing roller surface comes off as the properties thereof are deteriorated by thermal stress. As a result, the surface coated material peels off before the lapse of a predetermined length of time (before the surface coated material is worn) having nothing to do with the number of actual copying operations. The fixing roller thus is considered to face the end of the service life thereof due to an adverse phenomenon which has hitherto been inconceivable.

The foregoing is a prediction of the deterioration of a fixing roller and a fixing silicon roller which is effective only to the extent of the currently-available knowledge. The knowledge presented above regarding the service life of the consumable parts is nothing but the technical one relating to the parts, and it is difficult to specify parameters having a deterministic effect on the service life. In order to find the real factors affecting the service life of the parts, therefore, it has been necessary for us to repeatedly compare the actual manner in which the fixing roller is operated with the actual length of time it is used.

This task has required the collection and analysis of lots of data over a long period of time, followed by repeated collection and analysis under the data measuring conditions corrected based on the result of previous analysis. Even the above-mentioned technique for monitoring the consumption of the fixing roller and the fixing silicon roller may become obsolescent any time in the future when a new, superior technique may be found.

Certainly, a superior method will be revealed in the future. At this time point, it is difficult to specify what is the future technique. It may become clear, for example, that the service life of the fixing unit is affected considerably by the accumulated time of temporary overshoots of the control temperature or the low- and high-temperature heat cycles. Such a problem could be readily obviated by a small correction of the technical specifications slightly. Actual execution of the small correction, however, makes it necessary to incorporate a corresponding program in an image forming apparatus.

An attempt to collect various parameters and confirm a correlation, at least as a test case, between an estimated service life and the actual service life of a given part under various conditions of machine operation will fail unless a required control procedure is incorporated in the image forming apparatus in advance. An actual product, however, has only a limited program memory. Even though it is desirable to incorporate a parameter collection program in advance, a control procedure for effective data collection is virtually impossible to specify before shipping the product from the factory.

As described above, the problem of the conventional image forming apparatus is that the service life of the parts such as the fixing roller and the fixing silicon roller, the properties of which are deteriorated with the length of waiting time, cannot be accurately grasped. Therefore, successful preventive maintenance is impossible.

Also, once a product is delivered to the user, adding a program of a new specification (a program intended to estimate the time before a specified part is consumed by changing the data collection parameters from time to time in accordance with the prevailing conditions) to the apparatus requires a change in the control program and hardware and thus involves a program installation work on a very large scale.

SUMMARY OF THE INVENTION

The object of the present invention is to provide an image forming apparatus in which preventive maintenance is possible by accurately grasping the service life of a given part deteriorated in characteristics with the length of waiting time and in which even after product shipment, a maintenance program of a new specification can be added or the existing maintenance program can be modified without changing the hardware or the machine control program. And this invention provides a method of above remote maintenance using a new specification program.

According to the present invention, there is provided an image forming apparatus comprising means for reading an image of an original and forming the image on an image-forming medium, means for detecting the status of the image forming apparatus, means for storing a first program for controlling the image forming means, means for requesting a second program for controlling the image forming apparatus according to the status of the image forming apparatus detected by the detection means, means for receiving the second program from an external device in accordance with the request of the requesting means, means for storing the second program received by the receiving means, and first control means for controlling the image forming means on the basis of the first program and the second program.

The present invention with the above-mentioned configuration has the following advantages.

Specifically, unlike in the prior art, the program for providing maintenance each time an error occurs in an image forming apparatus according to the invention is not limited to the one which is incorporated before shipment. Instead, according to the present invention, a signal is generated requesting a maintenance program to an external device in accordance with an error that occurs at a given time, whereby an image forming apparatus according to the invention can acquire the latest maintenance program. It is thus possible to conduct a versatile, efficient maintenance job without sticking to a stereotyped countermeasure specified at the time of manufacture.

For example, the operating conditions (such as the frequency in which the apparatus is used or the concentration on a given type of specification) of a particular image forming apparatus are collected from customers after shipment. Also, errors which have occurred in the apparatuses of many other customers and data on what may be effective maintenance methods that have been employed against them are collected by the persons in charge of maintenance. Once an effective maintenance method is established and a program is prepared by the maintenance person for realizing such an efficient program, the program becomes ready for execution in the image forming apparatus according to the invention. As a result, a program for realizing the latest maintenance technique which could not hitherto been obtained can always be used. According to the invention, therefore, there is provided an image forming apparatus for which an efficient and a most suitable maintenance can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

An embodiment of the invention will be described below with reference to the accompanying drawings.

Figure 2:
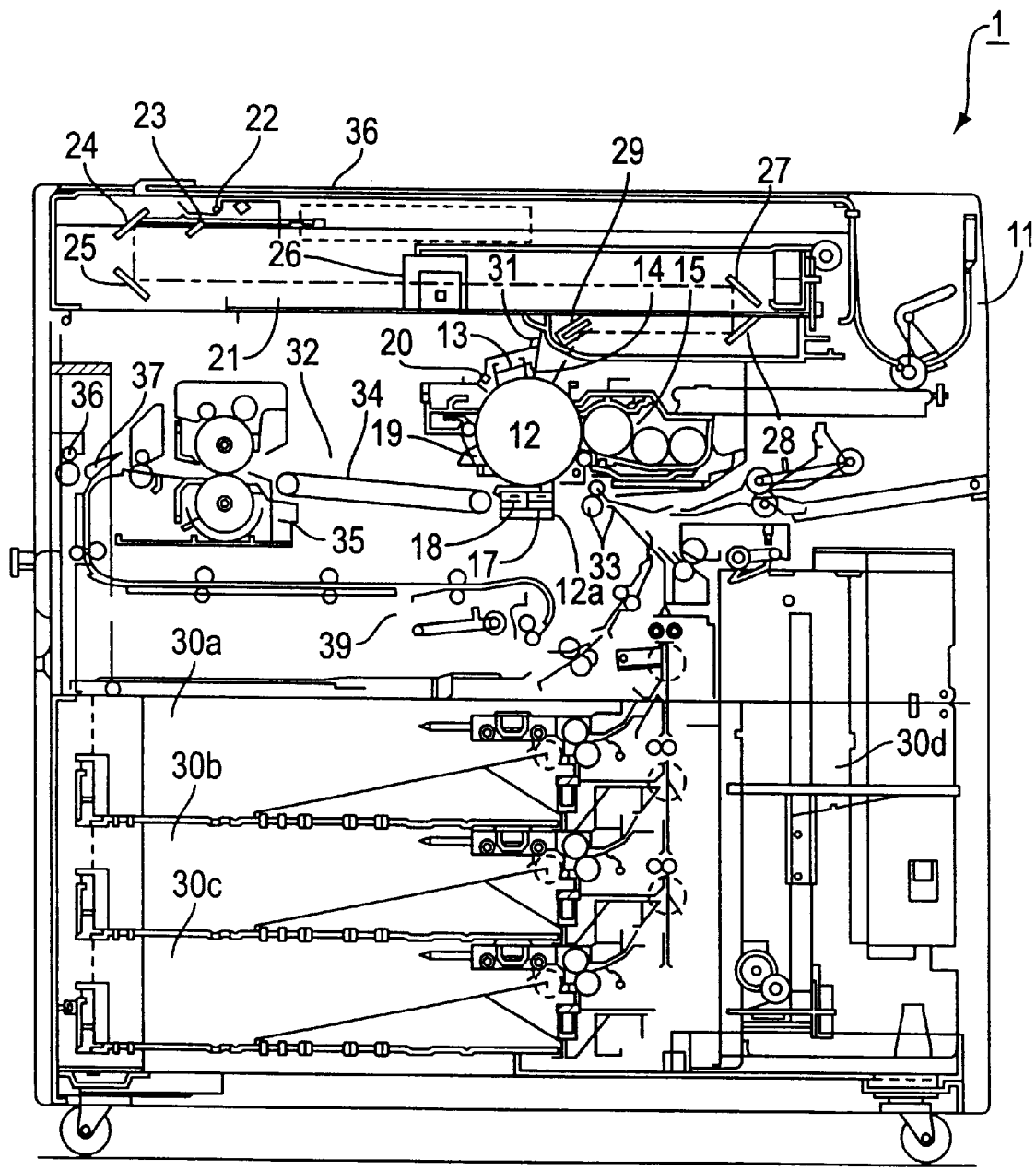
FIG. 2 is a sectional view showing an internal configuration of the body of the copier.

FIG. 2 shows an internal configuration of a body 11 of a copier 1 constituting an image forming apparatus according to the present invention. A photosensitive drum 12 is rotatably arranged at the substantial center in the body 11.

An electrostatic charger 13, an LED array 31, an exposure unit 14, a developing unit 15, a transfer charger 17, a separation charger 18, a cleaner 19 and an eraser 20 are arranged in that order along the direction of rotation on the peripheral part of the photosensitive drum 12.

Also, an exposure system 21 is disposed in the upper part in the body 11. The exposure system 21 includes an exposure lamp 22, first to third reflection mirrors 23, 24, 25, a magnification-changing lens block 26, and fourth to sixth reflection mirrors 27, 28, 29.

Paper feed cassettes 30a, 30b, 30c and a large-capacity paper feed cassette (LCF) 30d capable of supplying at least 1000 sheets of paper are arranged on one side of the body 11.

The paper (image-forming medium) fed from the paper feed cassettes 30a, 30b, 30c or the large-capacity paper feed cassette 30d is adapted to be transported along a paper transport path 32.

Resist rollers 33, transfer and separation chargers 17, 18, a transport belt 34, a fixing unit 35 and a paper discharge roller pair 36 are arranged in that order along the direction of transport of the paper P on the paper transport path 32.

Further, an original rest 38 is located on the upper surface of the body 11.

In normal copy mode, light is scanned on the original placed on the original rest 38, and the light reflected is focused on the photosensitive drum 12 with the surface thereof charged by the electrostatic charger 13 thereby to form an electrostatic latent image. This electrostatic latent image is developed by the developer supplied thereto. At the same time, the paper P is supplied from the paper feed cassettes 30a, 30b, 30c or the large-capacity cassette 30d, so that the paper P is fed to an image transfer unit 12a between the photosensitive drum 12 and the transfer charger 17 thereby to transfer a developed image from the photosensitive drum 12 onto the paper P. The paper to which the image is transferred is separated from the photosensitive drum 12 by means of the separation charger 18, and sent to by the transport belt 34 and fixed in the fixing unit 35 constituting fixing means. The paper P on which the image is fixed is discharged through the discharge roller pair 36.

In the case where images are copied on the two sides of the paper, a gate means 37 is switched to an inverted paper feeder 39. Thus the paper P is led to the inverted paper feeder 39, where the paper is reversed and transported along the paper transport path 32 again. An image is transferred on the reverse side, and then the paper is fixed and discharged.

Figure 3:
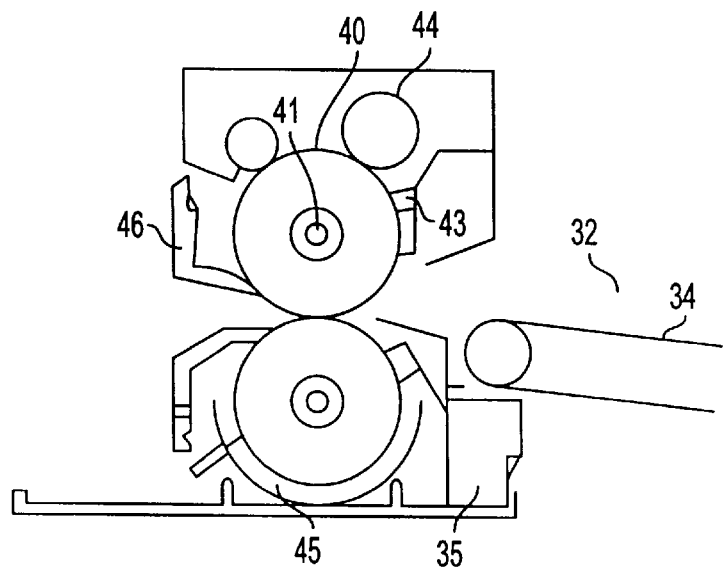
FIG. 3 is a diagram showing a configuration of a fixing unit.

FIG. 3 shows a configuration of the fixing unit 35. The fixing unit 35 includes a fixing roller 40 with an aluminum core metal and a teflon-coated surface, a heater lamp 41 for heating the fixing roller 40 from within, a temperature sensor 43 constituting detection means for detecting the surface temperature of the fixing roller 40, a fixing silicon roller 44 for applying silicon oil on the surface of the fixing roller 40, a silicon rubber roller 45 for applying heat to the paper pressed against the surface of the fixing roller 40, and a stainless steel pawl 46 for separating the paper P from the fixing roller 40 after being passed between the fixing roller 40 and the silicon rubber roller 45.

Upon complete copying operation, the paper P to which the image has been transferred on the photosensitive drum 12 is led by the fixing roller 40 and the silicon rubber roller 45 of the fixing unit 35. In the process, the paper P is heated by the fixing roller 40 and the silicon rubber roller 45 in rotation, with the result that a toner is melted and fixed. The paper P that has passed through the fixing roller 40 and the silicon rubber roller 45 is separated from the fixing roller 40 and discharged into a discharge tray 4 by means of the silicon oil supplied from the fixing silicon roller 44 rotating like the fixing roller 40 on the one hand and the stainless steel pawl 46 on the other hand.

In the above-mentioned process, when the two rollers including the fixing roller 40 and the silicon rubber roller 45 rotate, the surface of the fixing roller 40 is worn by being rubbed by the stainless steel pawl 46. The result is the wear of the fixing roller 40 described above with reference to the second aspect of the prior art. In similar fashion, as a result of the silicon oil being supplied to the fixing roller 40 with the rotation of the fixing silicon roller 44, the silicon oil stored in the fixing silicon roller 44 is consumed as described with reference to the first aspect of the prior art.

Figure 1:
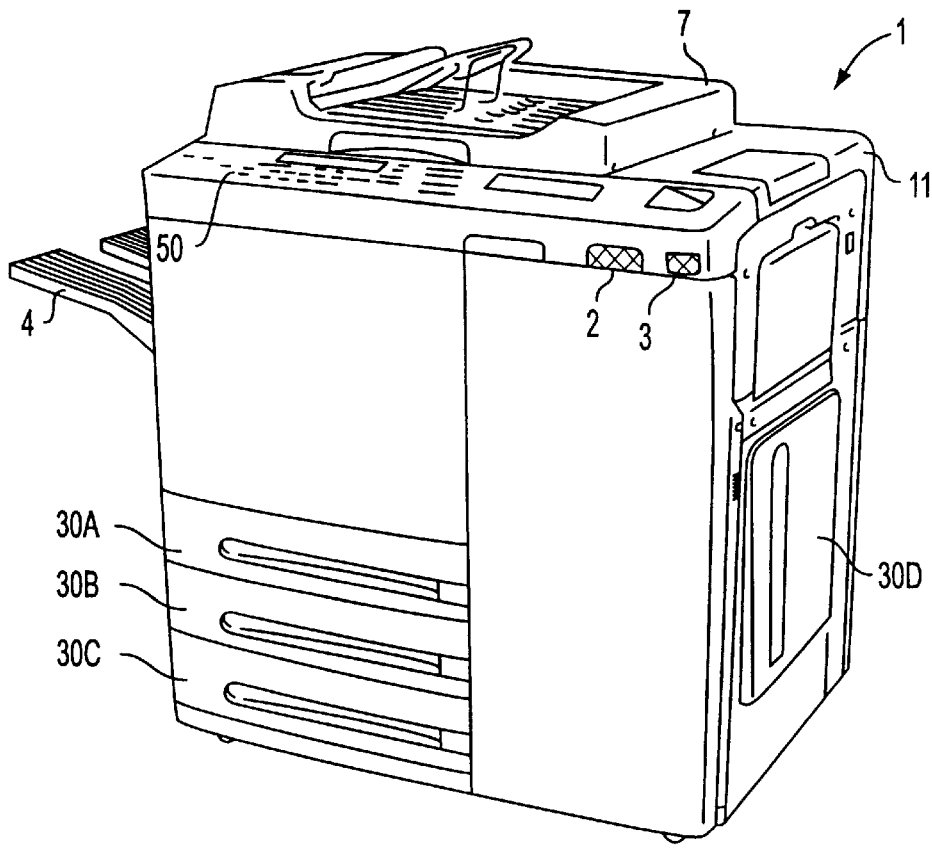
FIG. 1 is a diagram showing an external configuration of a copier providing an image forming apparatus according to the present invention.

FIG. 1 shows an external configuration of the copier 1 constituting an image forming apparatus according to the present invention. The copier 1 comprises an automatic original feeder (ADF) 7 on the upper part of the body 11 and an operating panel 50 on the upper front part of the body 11 for inputting various copying conditions and a copy start signal for starting the copying operation. Also, the paper feed cassettes 30a, 30b, 30c, 30d are arranged in the lower part of the body 11. Further, an IC card insertion hole 2 and a remote monitor connector 3 are arranged on the upper front side of the body 11. A discharge tray 4 into which the copied paper P is discharged is arranged at the left end of the body 11.

Figure 4:
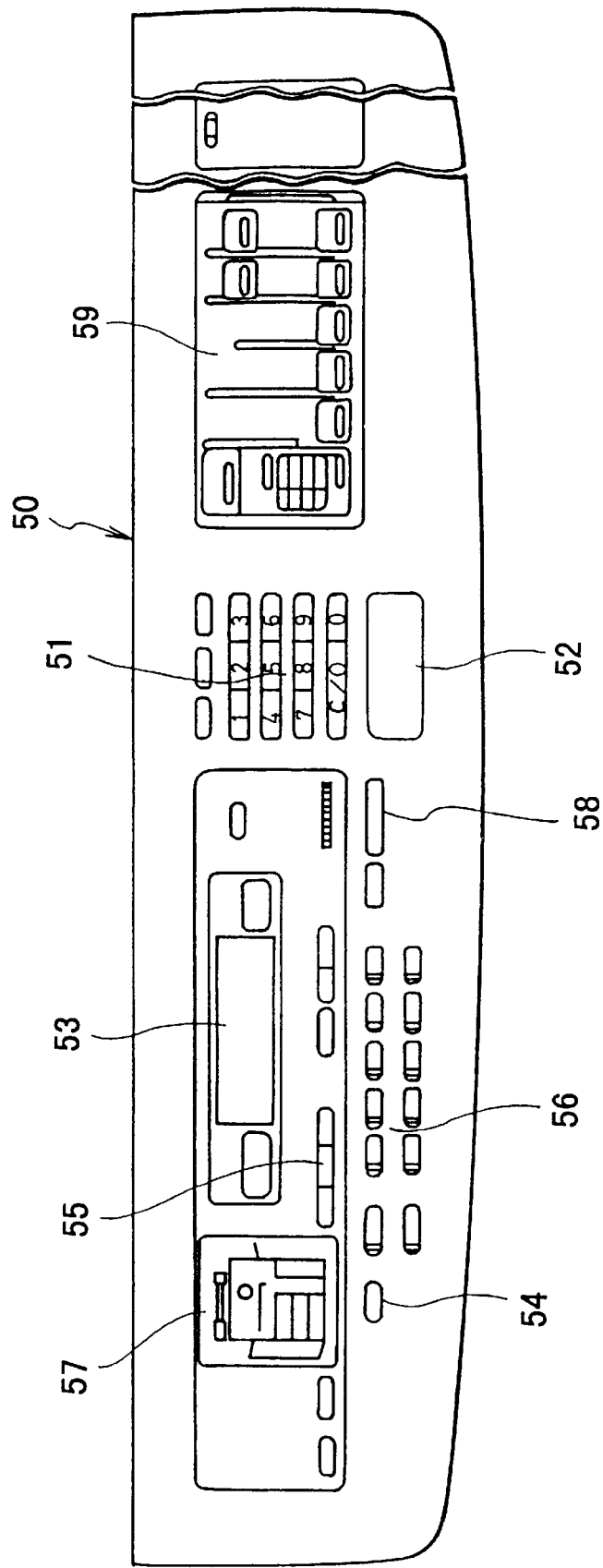
FIG. 4 is a diagram showing a configuration of an operating panel.

FIG. 4 shows a configuration of the operating panel 50 including a ten-key board 51, a copying key 52, a display section 53, a cassette key 54, zoom up/down keys 55, a size selecting section 56, a status indicator 57, density setting keys 58 and a mode setting section 59.

The ten-key board 51 includes keys 0 to 9 for setting the number of originals loaded and the number of copies desired.

The copying key 52 is for instructing the copy operation to be started.

The display section 53 is a reporting means for displaying the number of originals, the number of copies and various other information such as the count value and the copying magnification as an operation guide.

The cassette key 54 is depressed to switch to another size of cassette when the cassette selected is not of the desired size.

The zoom up/down keys 55 are for setting the magnification for enlarging or compressing the original.

The status indicator 57 indicates a jam condition, etc. by turning on a light-emitting diode.

The density setting keys 58 are for setting the image density at "thin" or "dense".

The mode setting section 59 is for setting various modes including the service mode SW10, the two-side mode, the binding margin, the edition, the frame removal and the page connection.

Figure 5A:
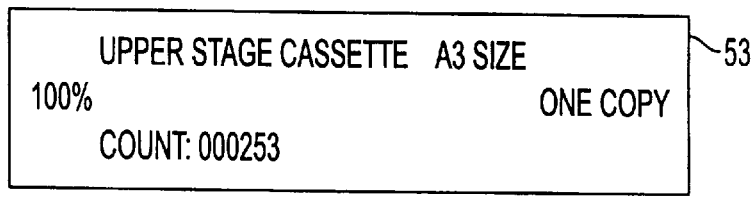
FIGS. 5A and 5B are diagrams showing an example display on a display section of the operating panel.
Figure 5B:
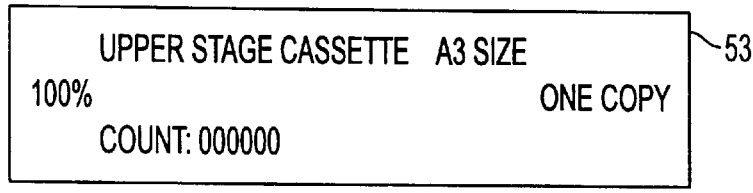

FIGS. 5A and 5B illustrate an example display on the display section 53 of the operating panel 50. FIG. 5A shows the case in which the operating panel 50 is manipulated to set the apparatus to service mode SW10 indicating the magnification of 100%, the upper stage cassette, i.e., the paper feed cassette 30a, the paper size of A3, one as the number of copies, and the count value of 000253.

Instead of setting to service mode SW10 through the operating panel 50, a center computer described later connected through a connector 3 may send a command requesting the transmission of the count value of each paper feed stage, so that the count value of each paper feed stage is transmitted to the center computer.

FIG. 5B shows an example indication obtained when the ten-keys 51 is operated during the indication of FIG. 5A. In the case where a new value is set by way of the ten-keys 51 during the indication of FIG. 5A, the value on each counter is changed appropriately.

Also, when the center computer connected through the connector 3 sends a count change request command for each paper feed stage, the copier 1 sets the received value as a new count value in each counter.

Figure 6:
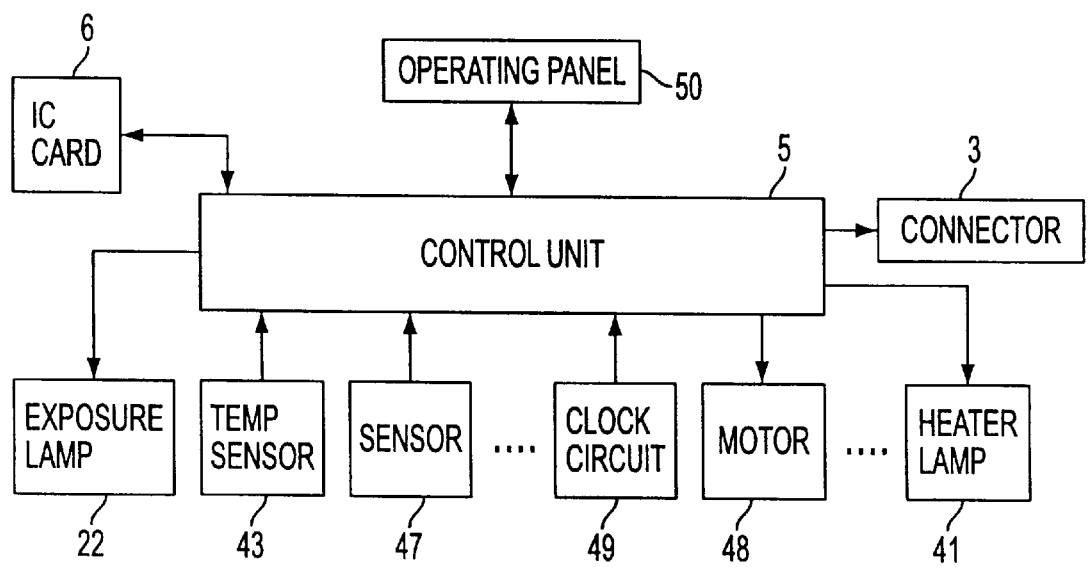
FIG. 6 is a diagram showing a control unit of the copier.

FIG. 6 shows a control unit for the copier 1 according to this embodiment. The control unit 5 is connected to various sensors 47, a motor 48, a clock circuit 49, an exposure lamp 22, a heater lamp 41, a temperature sensor 43 and the operating panel 50. The control unit 5 is also connected to the connector 3 and an IC card 6.

The control unit 5 detects the surface temperature of the fixing roller 40 using the temperature sensor 43 and turns on/off the heater lamp 41 to control the surface temperature of the fixing roller 40 to a predetermined level.

Figure 7:
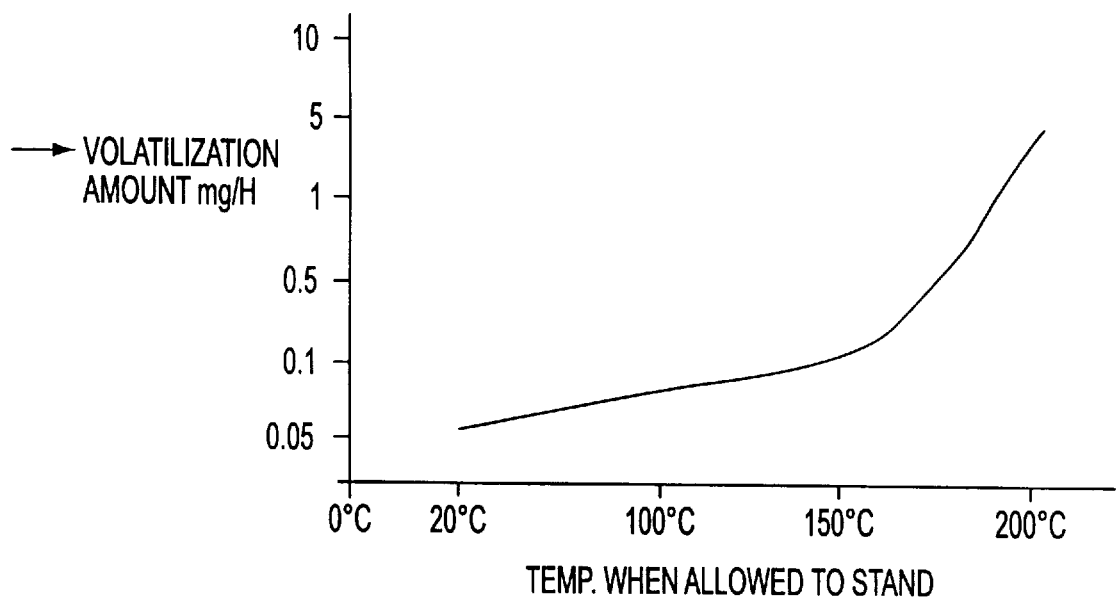
FIG. 7 is a diagram showing the volatility characteristic of the silicon oil used for a fixing silicon controller.

FIG. 7 shows the volatility characteristic of the silicon oil used for the fixing silicon roller 44. As shown in FIG. 7, the volatilization of the silicon oil is accelerated with the rise of the temperature at which it is left to stand. The oil according to the present embodiment volatilizes at 190° C. in wait mode at a rate more than 30 times higher than at room temperature. As described above with reference to the first aspect of the prior art, it is seen that the length of waiting time has a great effect on the life of the fixing silicon roller 44.

Figure 8:
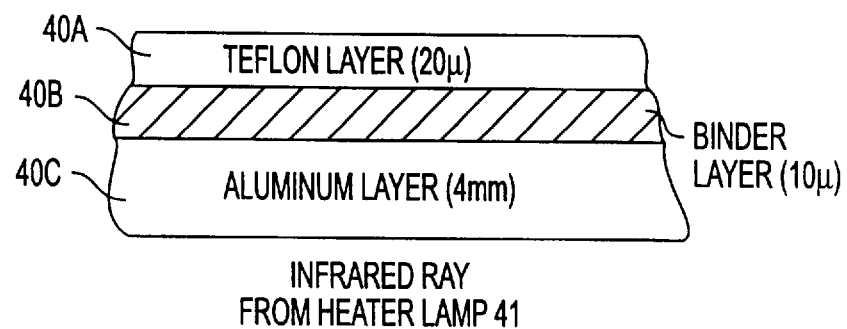
FIG. 8 is an enlarged sectional view showing a surface coated part of a fixing roller.

FIG. 8 is an enlarged sectional view of the surface coated section of the fixing roller 40. The teflon layer 40a coated on the surface is bonded to an aluminum layer 40c by a binder layer 40b providing an adhesive. The aluminum layer 40c increases in temperature when the heater lamp 41 contained therein turns on.

When the temperature of the aluminum layer 40c increases, the resulting heat is imparted through the binder layer and the teflon layer thereby to increase the surface temperature. With the increase in surface temperature, the temperature sensor 43 arranged on the surface detects the temperature increase and the control unit 5 turns off the heater lamp 41. As the heat is dissipated by the fixing roller 40, the heater lamp 41 repeatedly turns on and off even during wait mode. The binder layer 40b of the fixing roller 40, therefore, is constantly subjected to compressive and expansive forces during wait mode due to the difference in thermal coefficient of expansion between the teflon layer 40a and the aluminum layer 40c.

As a result, as described with reference to the second aspect of the prior art, the length of the waiting time has a great effect on the service life of the fixing roller 40.

Figure 9:
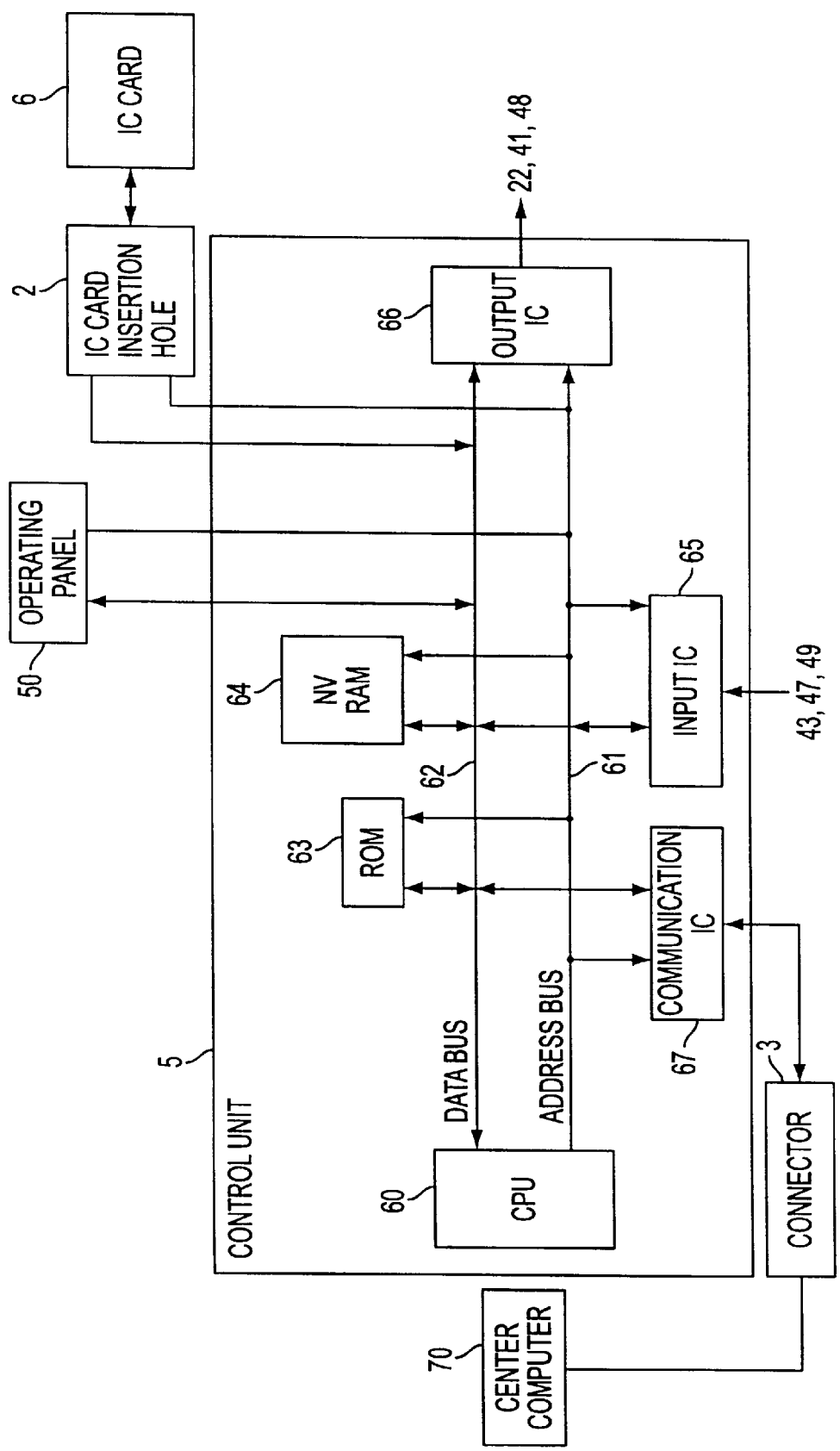
FIG. 9 is a diagram showing a configuration of a microcomputer used for the control unit.

FIG. 9 shows a configuration of the microcomputer used for the control unit 5 according to this embodiment.

An address bus 61 and a data bus 62 extend from the CPU 60 responsible for the overall control operation of the control unit 5. These bus lines are connected with a ROM 63, a nonvolatile RAM (NVRAM) 64, an input IC 65, an output IC 66, an interface communication IC 67 connected with the connector 3, the operating panel 50 and the IC card insertion hole 2 in which the IC card 6 is inserted. For the purpose of communication control, the control unit 5 is connected to the center computer 70 such as a personal computer through the connector 3 connecting to the communication IC 67 constituting transmit/receive means. The control unit 5 is thus controlled by communication.

The ROM 63 has stored therein a program for inputting the outputs of the sensors installed in the copier 1, processing the data obtained and outputting various signals for operating actuators, a program for controlling the operating panel 50, and a program for the IC card and the communication IC connected to the connector 3.

Figure 10:
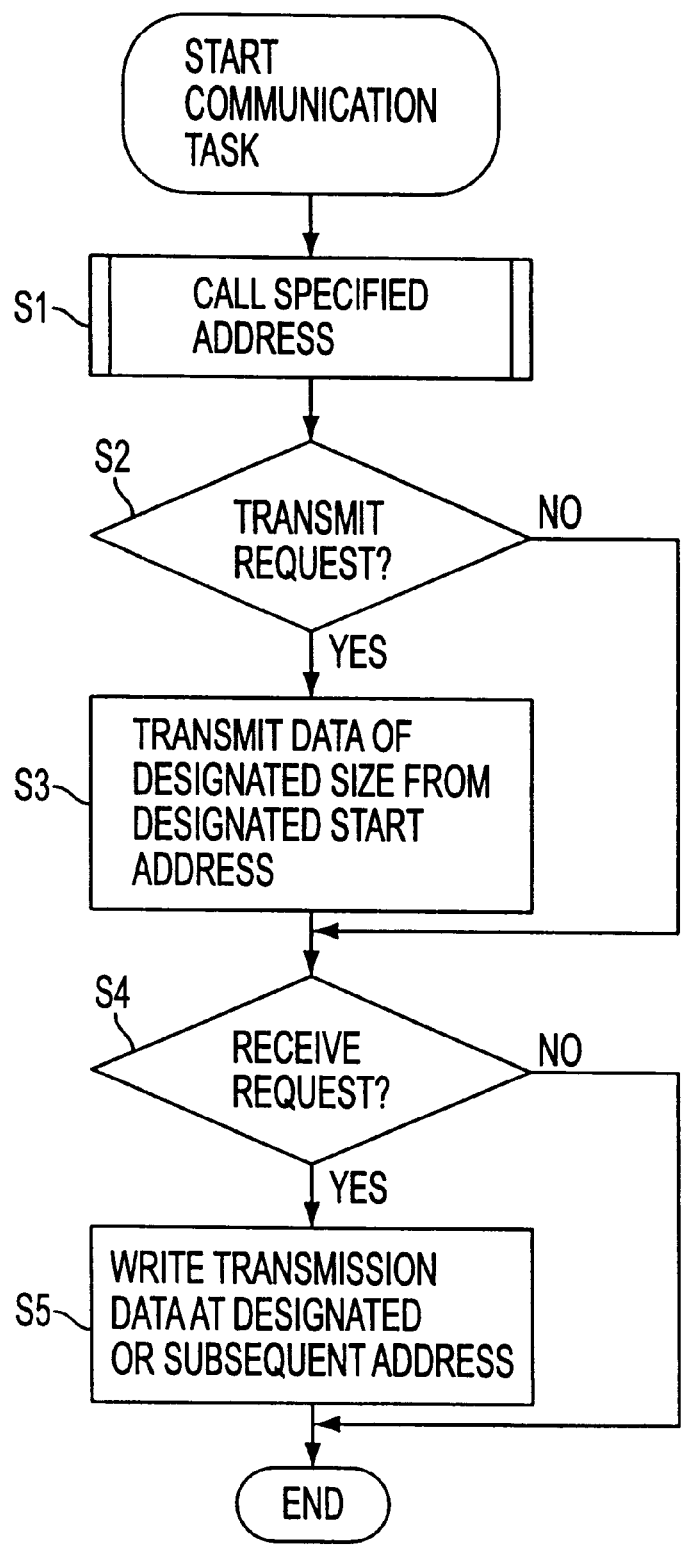
FIG. 10 is a flowchart for explaining the operation of a communication task.

FIG. 10 shows a part of the programs built in the ROM 63 of the control unit 5 according to this embodiment. Specifically, FIG. 10 is a flowchart for explaining the "communication task" related to the interface with the connector 3. The communication task is activated at regular time intervals by the function of an overall management program or an operating system (hereinafter referred to as the OS) not shown.

The communication task, when activated, first calls the application subroutine on the NVRAM 64 (S1). The application subroutine is the one starting from a specified address on the NVRAM 64. At the time of product shipment, the "waiting time count subroutine" configured on the NVRAM 64 is called, so that the waiting time of the fixing roller 40 and the fixing silicon roller 44 is counted and accumulatively recorded in the total waiting time area on the NVRAM 64.

The communication task then checks whether a transmit request is issued through the connector 3 (S2), and if a data transmit request command is found issued, the transmit start address attached to the command is called and the transmission size designated by the command is sent to the center computer 70 (S3).

The center computer 70 connected through the connector 3 designates the total waiting time area on the NVRAM 64 as a transmit start address, and a size equal to the total waiting time area as a transmission size. As a result, the time during which the fixing roller 40 and the fixing silicon roller 44 are set in wait mode is monitored. Upon complete data transmission, the communication task checks whether a data receive request command is issued or not (S4).

In the case where a data receive request command is issued from the center computer 70, a plurality of designated data attached to the command are written by an amount equivalent to a designated size from a designated write start address (S5).

Assume that the center computer 70 designates the paper feed counter as a write start address. The designated data is written as a renewed paper feed count value, so that the paper feed count value can be changed remotely as described with reference to FIG. 5. Upon complete data receipt, the communication task is terminated, and the control unit 5 performs other tasks for the copier 1 and, after a predetermined length of time, repeats the execution of the communication process.

Figure 11:
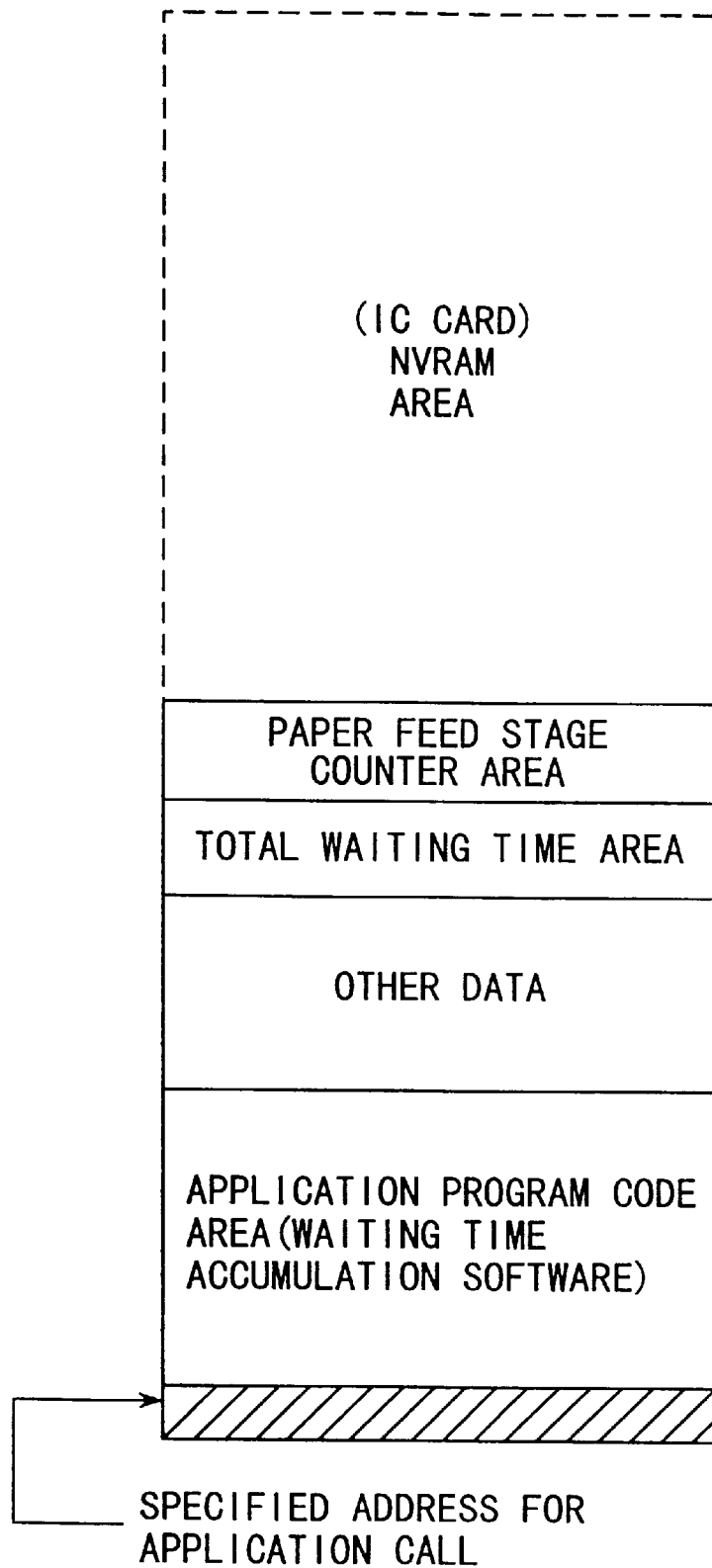
FIG. 11 is a diagram showing a map of NVRAM according to an embodiment.

FIG. 11 is a map of the NVRAM 64 according to this embodiment. When the NVRAM (IC) card 6 is inserted into the IC card insertion hole 2, the NVRAM area is enlarged.

Figure 12A:
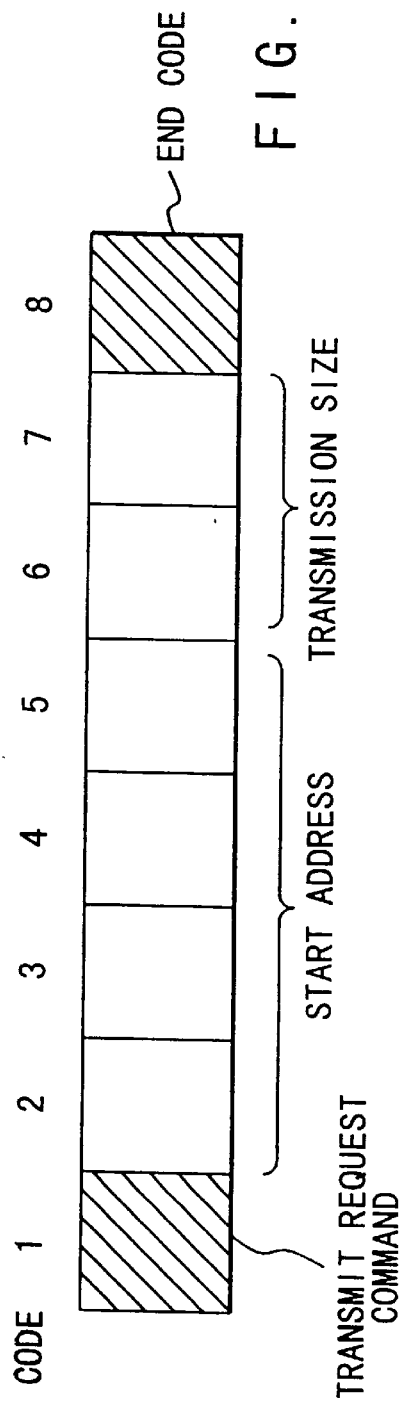
FIGS. 12A and 12B are diagrams showing the formats of transmit and receive request commands according to the embodiment.
Figure 12B:
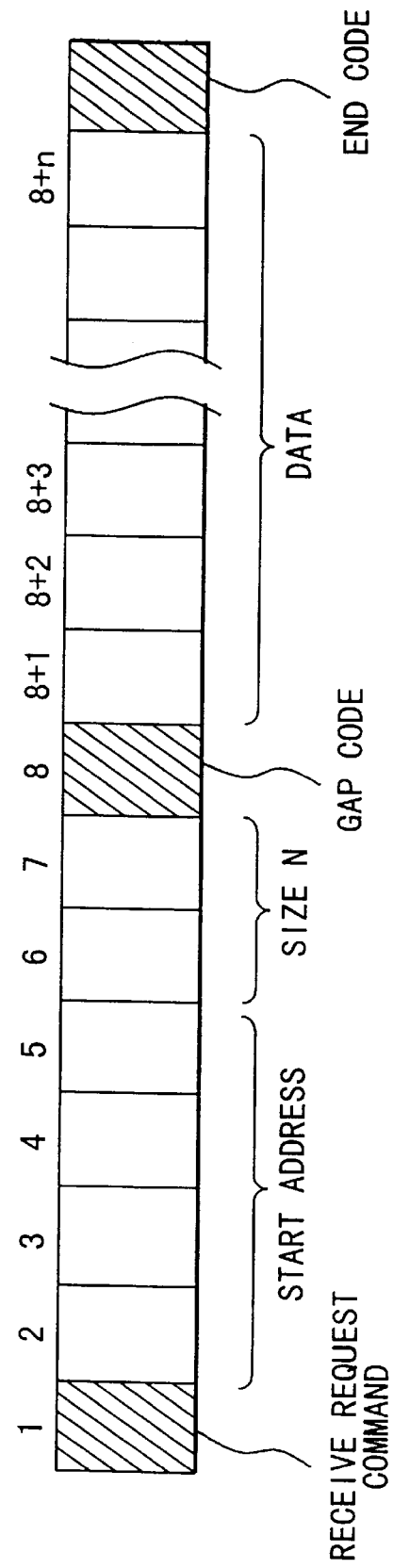

FIGS. 12A and 12B show formats of the transmit and receive commands according to the present embodiment. As shown in FIG. 12A, the transmit command is configured of a transmit request command, a start address, a transmission size and an end code. On the other hand, as shown in FIG. 12B, the receive command is constructed of a receive request command, a start address, a size n, a gap code, a data and an end code.

The center computer 70 designates the head address of the area written with the "waiting time count subroutine" program of the NVRAM 64 as a write start address of the receive request command. When the center computer attaches a new "waiting time count subroutine program code" as the designated data, then the "waiting time count subroutine" of the copier 1 can be changed.

In the prior art, a program is so configured that the waiting time begins to be accumulated when the fixing unit 35 reaches a copying temperature (180° C.). Such a program can be modified by a transmit command to start the counting when the temperature of the fixing unit 35 exceeds 150° C., for example. The feature of the present invention is that the program can be changed easily even after shipment by configuring a monitor program in the NVRAM 64 and making it possible to change the related data as described above. Especially, when the NVRAM (IC) card 6 is inserted in the IC card insertion hole 2, the NVRAM area is enlarged as shown in FIG. 11. It is therefore possible to incorporate a larger program.

The availability of a program from an external device (server, etc.) constituting the feature of the invention will be described in detail later with reference to a flowchart.

Now, the operation of starting to accumulate the waiting time according to various programs transmitted will be explained with reference to FIGS. 13A, 13B and 14.

Figure 13A:
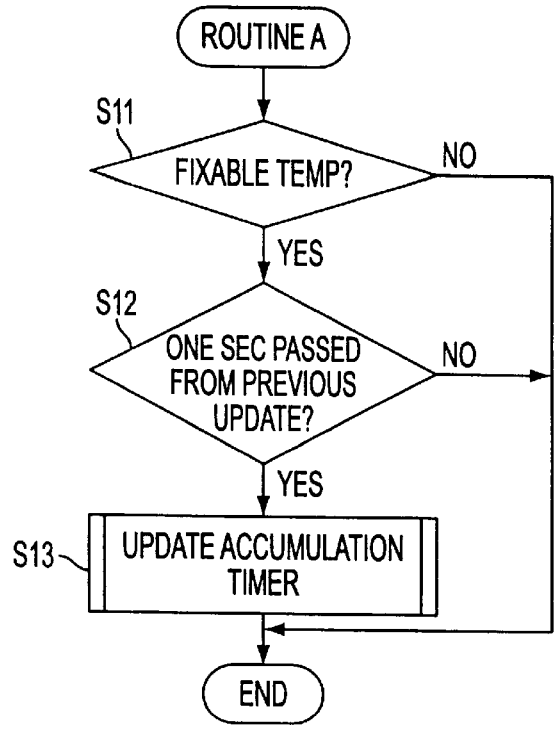
FIGS. 13A and 13B are flowcharts for explaining the operation of starting the accumulation of the waiting time.
Figure 14:
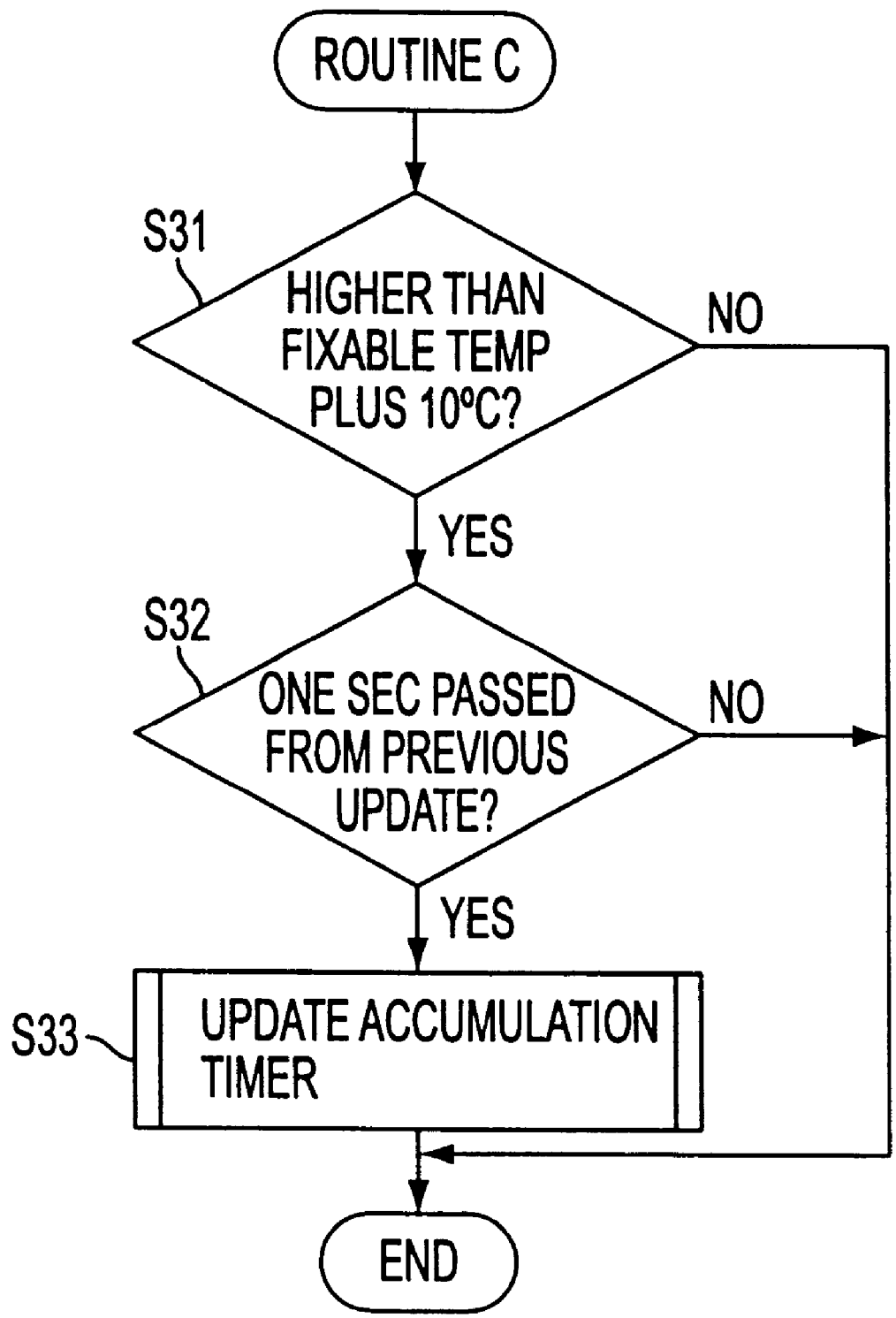
FIG. 14 is a flowchart for explaining the operation of starting the accumulation of the waiting time.

Reference is made to FIG. 13A for explaining the case in which the program shown in routine A is transmitted. First, the fixing unit 35 is checked to make sure whether the temperature thereof is a fixable one or not (S11). If the temperature has not reached a fixable level, the process ends, while if the fixable temperature is reached, the time is checked to see whether one second has elapsed from the previous update (S12). Unless one second has elapsed, the process ends, while if one second has passed, the accumulation timer is updated (S13).

Figure 13B:
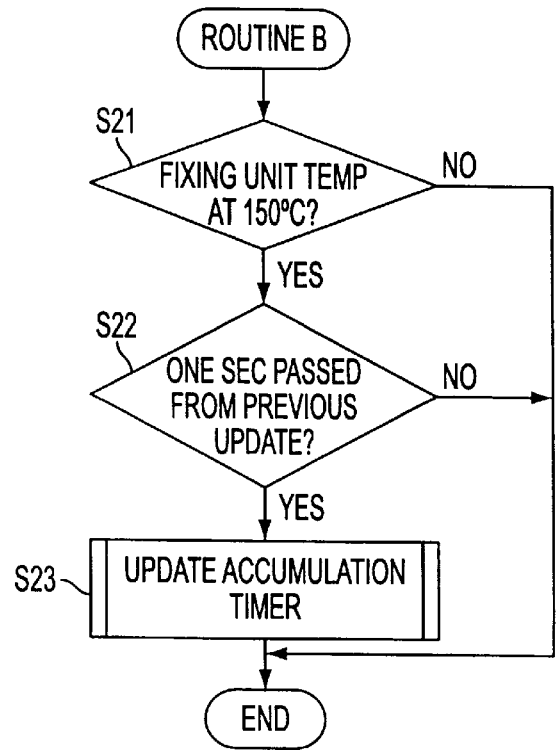

With reference to FIG. 13B, explanation will be made about the case in which the program shown in routine B is transmitted. First, the fixing unit 35 is checked to see whether its temperature is 150° C. or not (S21). If the temperature of the fixing unit 35 is less than 150° C., the process ends, while if the temperature is 150° C. or higher, the time is checked to see whether one second has passed from the previous update (S22). If one second has not passed, the process ends, while if one second has passed, the accumulation timer is updated (S23).

The operation for the case in which the program shown in routine C is transmitted will be explained with reference to FIG. 14. First, the temperature of the fixing unit 35 is checked to see whether it is higher than a fixable temperature plus ten degrees (S31). In the case where the temperature of the fixing unit 35 is not higher than the fixable temperature plus ten degrees, the process ends. If the temperature of the fixing unit 35 is higher than the fixable temperature plus ten degrees, on the other hand, the time is checked to see whether one second has passed from the previous update (S32). Unless one second has passed, the process ends, while if one second has passed, the accumulation timer is updated (S33).

Figure 15:
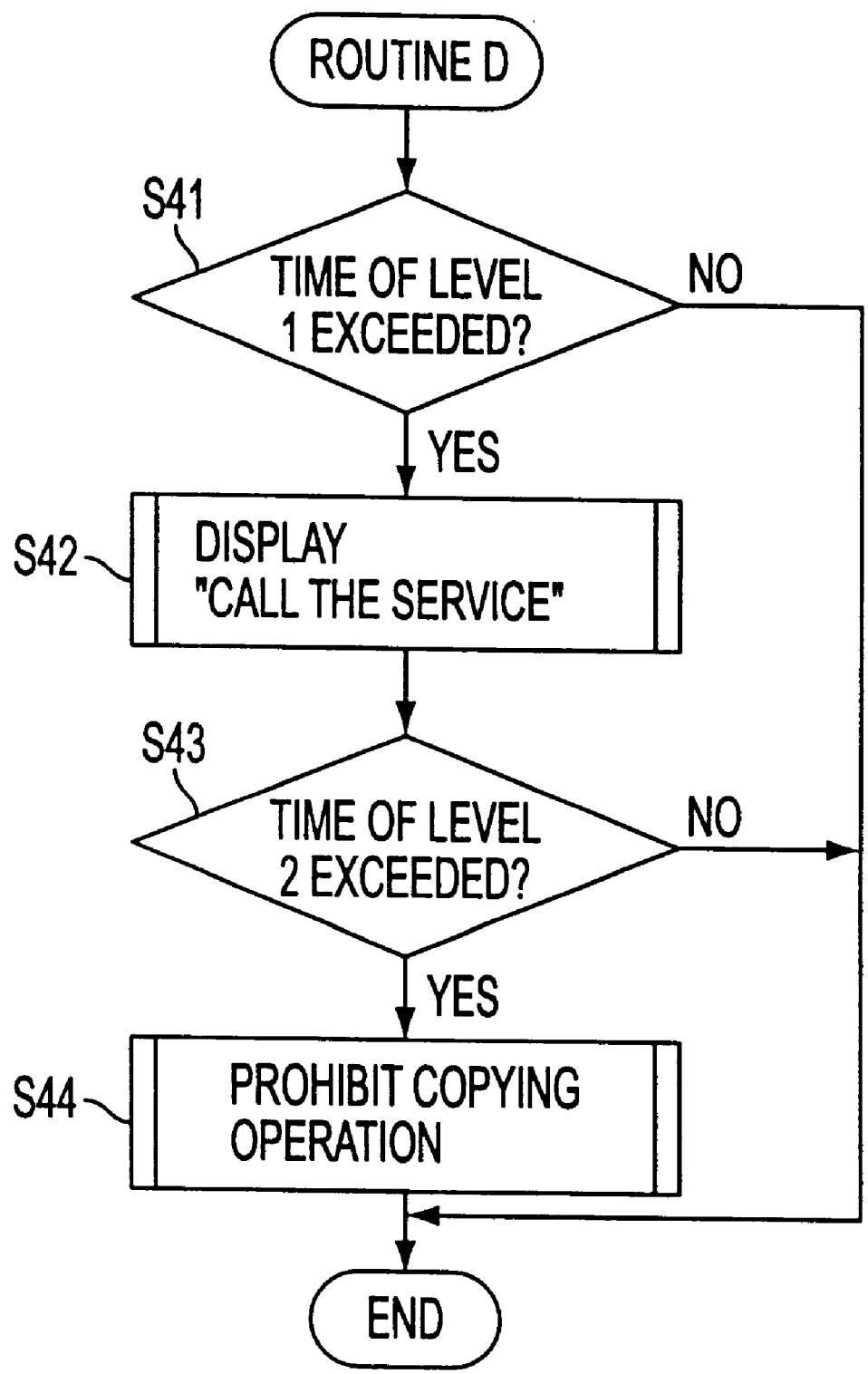
FIG. 15 is a flowchart for explaining the operation corresponding to the accumulated time of an accumulation timer.

Now, the operation corresponding to the accumulation time indicated by the accumulation timer will be explained with reference to the flowchart of FIG. 15. Specifically, the accumulation timer is checked as to whether the time of level 1 has been exceeded or not as routine D (S41). If the time of level 1 is not exceeded, the process ends. In the case where the accumulation timer has exceeded the time of level 1, on the other hand, "CALL THE SERVICE" is indicated on the display section 53 of the operating panel 50 (S42). Further, the accumulation timer is checked to see whether the time of level 2 has been exceeded (S43). If the time of level 2 is not exceeded, the process ends, while if it is exceeded, the copying operation is prohibited (S44).

Figure 16:
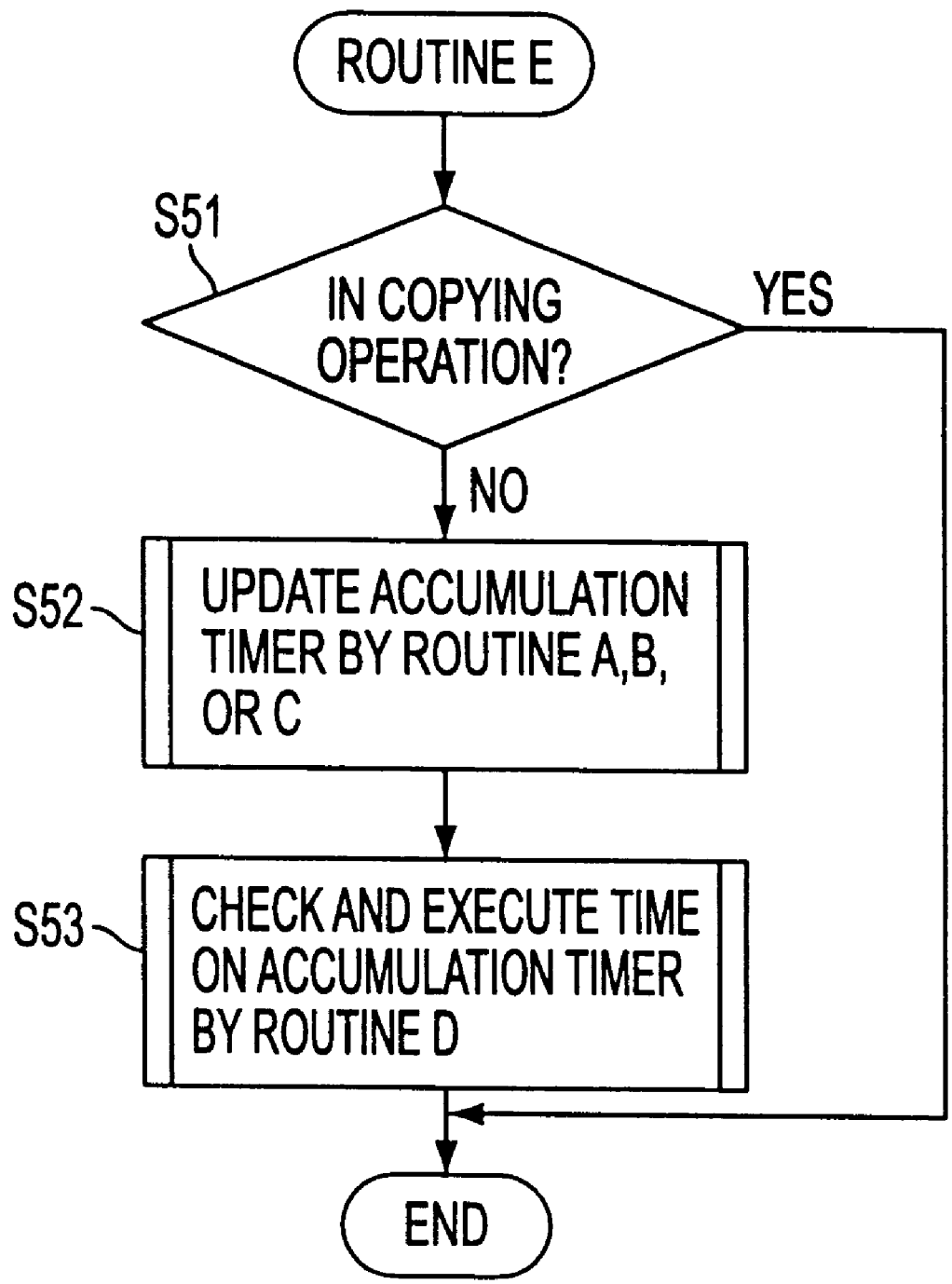
FIG. 16 is a flowchart for explaining the operation of a copier using routines A to D.

Now, the operation of the copier 1 using routines A to D will be explained with reference to the flowchart of FIG. 16.

The copier 1 is checked whether it is in copying operation or not as routine E (S51), and if it is in copying operation, the process ends. In the case where the copier 1 is not copying but waiting, the accumulation timer is updated by routine A, routine B or routine C (S52). The time on the accumulation timer is checked by routine D, and maintenance work corresponding to the result of check is executed (S53).

As explained above, according to this embodiment of the invention, a new preventive maintenance means can be provided for accurately grasping in advance the life of the parts such as the fixing roller or the fixing silicon roller which deteriorates in characteristics in accordance with the length of waiting time. Even a copier very infrequently used, therefore, can be kept in a superior operating condition.

Also, even after product shipment, a program for changing the "data collection parameters for estimating the consumption of a specified part" from time to time according to the prevailing conditions can be added or changed, as required, without changing the hardware or the program for controlling the copier proper.

The program change and management after shipment constituting the feature of the invention as applied to the the electronic copier (DPPC) for performing various processes through digital images will be explained in detail with reference to the flowcharts of FIGS. 17A, 17B and 17C.

Figure 18:
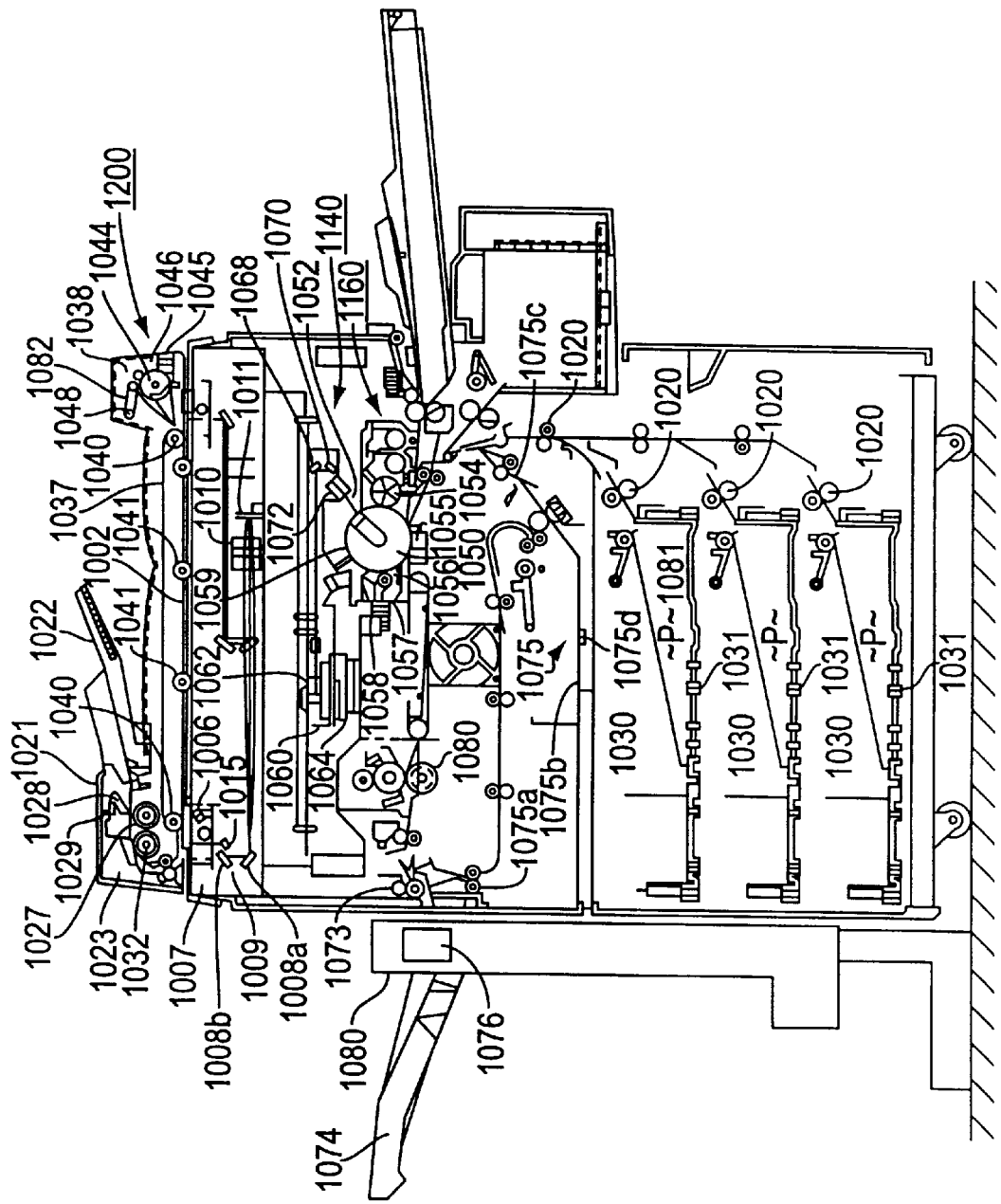
FIG. 18 is a sectional view showing an internal configuration of the body of a digital copier according to the invention.

FIG. 18 is a diagram schematically showing a general configuration of an electronic copier (DPPC) as an image forming apparatus according to the present invention. This apparatus comprises an original scanner 1140, an image forming unit 1160, and further, an automatic original supply unit 1200 on the upper part thereof.

In the automatic original supply unit 1200, the rear edge of a cover body 1021 is mounted free to open or close through a hinge not shown at the upper rear edge of the apparatus body. The whole of the automatic original supply unit 1200 is rotatively displaced as required to release the upper surface of the original rest 1002. An original supply table 1022 capable of holding a plurality of originals collectively is arranged to the slight right of the upper surface of the cover body 1021. A feeder means 1023 for taking out and supplying the originals one by one to an end of the original rest 1002 (extreme left in FIG. 18) is arranged at an end of the apparatus.

An original scanner 1140 includes an exposure lamp 1006 as a light source, a first carriage 1007 carrying a mirror 1015, a second carriage 1009 carrying mirrors 1008a, 1008b for bending the light path, a lens 1010, a photoelectric transducer 1011 for receiving the reflected light, a drive system (not shown) for changing the position of each of these parts, and an A/D converter (not shown) for converting the output of the photoelectric transducer 1011, i.e., an image data from analog into digital data. The first and second carriages 1007, 1009 are coupled to each other by a timing belt (not shown). The second carriage 1009 is adapted to move along the same direction as the first carriage 1007 at a rate one half that of the first carriage 1007. As a result, the light path up to the lens 1010 can be scanned in a fixed length. The lens 1010 with a fixed focal length is adapted to move along the light axis at the time of changing the magnification. The photoelectric transducer 1011 is for photoelectric conversion of the light reflected from the original and includes a CCD line image sensor, for example, as a main component thereof. In the case under consideration, each pixel of the original corresponds to an element of the CCD sensor. The output of the photoelectric transducer 1011 is applied to the A/D converter. Each of the first and second carriages 1007, 1009, and the mirrors 1008a, 1008b is moved by a stepping motor (not shown), respectively. The first and second carriages 1007, 1009 are adapted to move in accordance with the operation of a timing belt (not shown) suspended between a drive pulley (not shown) and an idle pulley (not shown) coupled to the rotational shaft of the stepping motor. The lens 1010 is adapted to move along the light axis according to the movement of a spiral shaft (not shown) which is rotated by a corresponding stepping motor (not shown).

The image forming unit 1160 is a combination of, for example, a laser optical system and an electro-photographic system capable of forming an image on the transfer paper. In other words, the image forming unit 1160 includes a photosensitive drum 1050 as an image carrier supported rotatably at substantially the central portion in the apparatus. The exposure unit 1052, the developing unit 1054, the transfer charger 1055, the separation charger 1056, the cleaning charger 1057, the erasing charger 1058 and the electrostatic charger 1059 are arranged in that order around the photosensitive drum 1050. The photosensitive drum 1050 is adapted to be uniformly charged by the electrostatic charger 1059. A laser beam is output from the original scanner 1140, so that an image of the original is focused thereby to form an electrostatic latent image on the photosensitive drum 1050.

The electrostatic latent image formed on the photosensitive drum 1050 is developed by the developing unit 1054, and a developed image is transferred by the transfer charger 1055 onto the copying paper P sent through the resist roller 1020 from the paper feed cassette 1030 constituting a paper feed means described later. The copying paper P thus transferred by the transfer charger 1055 is separated by the separation charger 1056 due to AC corona discharge and, through a transport belt, transported to the fixing unit 1080, where the developed image is fixed by being melted.

Figure 19:
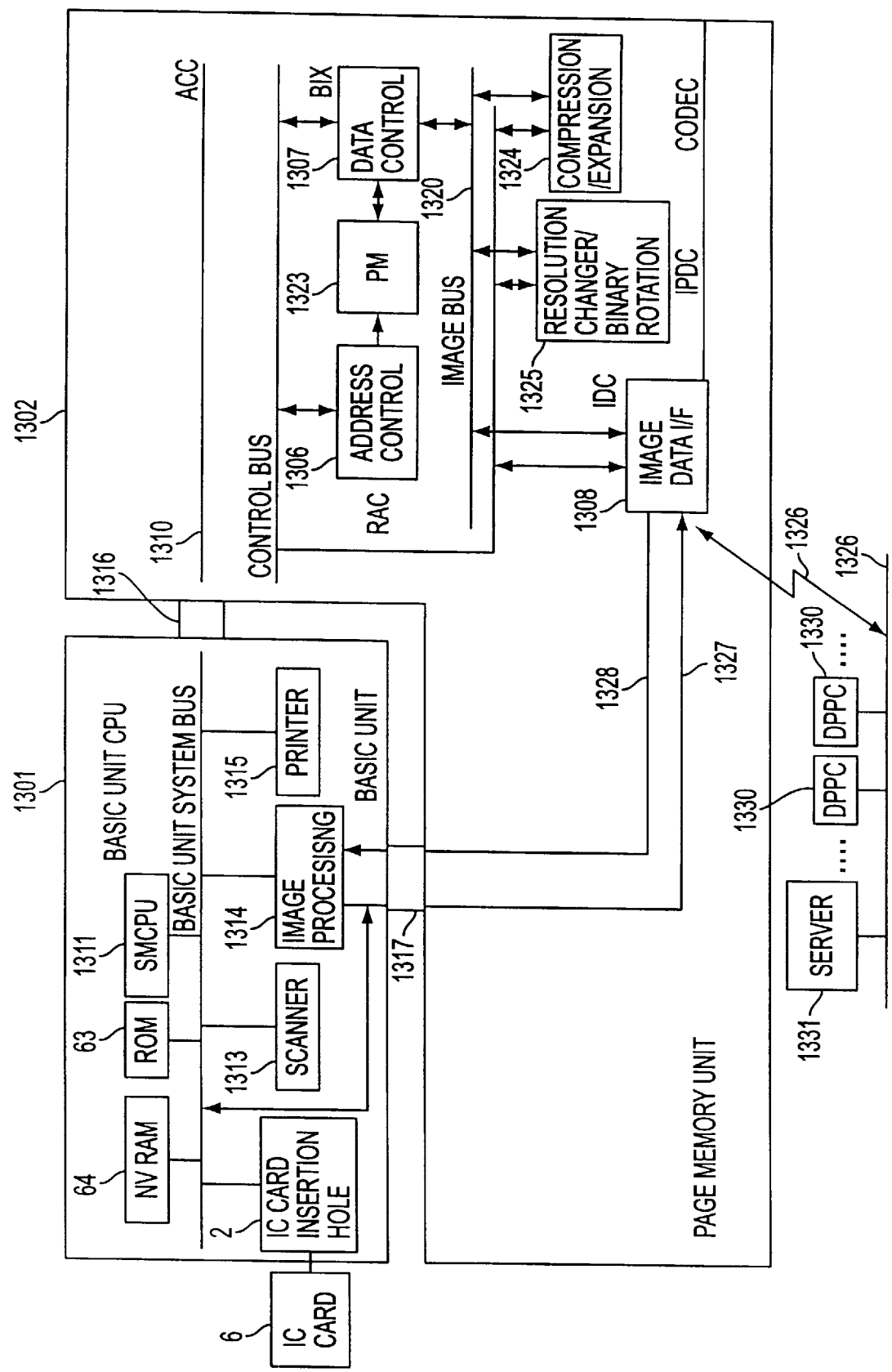
FIG. 19 is a block diagram showing a digital copier according to the invention.
Figure 20:
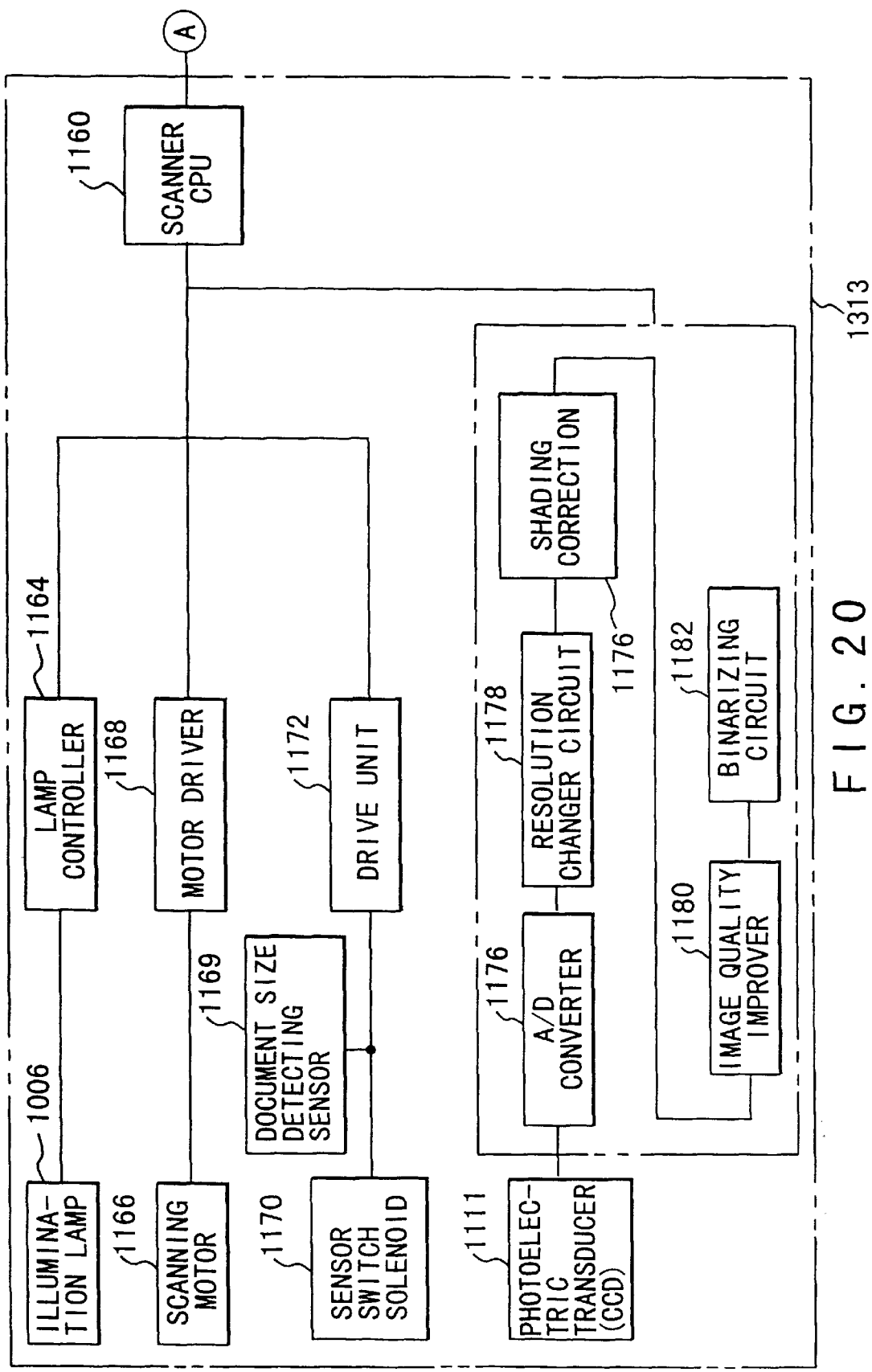
FIG. 20 is a block diagram for explaining a scanner unit of a digital copier according to the invention.

Now, the control circuit for the image forming apparatus will be explained with reference to FIGS. 18 to 20. FIG. 19 is a block diagram schematically showing a configuration of the image forming apparatus such as a digital copier control system according to an embodiment. FIG. 20 shows the scanner.

The digital copier control system is roughly divided into two blocks including a basic unit 1301 constituting a digital copier. The basic unit 1301 connects a scanner 1313 and a page memory unit 1302 by an image processing means 1314. The page memory unit 1302, on the other hand, receives and stores the image data from the basic unit and realizes a memory copy by returning the stored image data to the basic unit 1301 again.

The basic unit 1301 and the page memory unit 1302 are connected to each other by a basic unit system interface 1316 for exchanging control data and a basic unit image interface 1317 for exchanging image data.

The basic unit 1301 includes an input means (scanner) 1313, an output means (printer) 1315, an image processing means 1314 and a control means (basic unit CPU) 1311 for controlling these means.

The main CPU of the control means (basic CPU) 1311 is connected to a ROM, a RAM, an image memory, a timer memory, a password code memory, a timer, an internal interface, and an external interface. The internal interface is connected with an operating panel, which in turns has arranged thereon an LCD display, a ten-key board, a job password mode button, a copy key, etc.

Now, a detailed configuration of the scanner 1313 will be explained with reference to FIG. 20. The scanner CPU 1160 of the scanner 1313 is connected to and controls a lamp controller 1164 for controlling an illumination lamp 1006, a motor driver 1168 for controlling a scanning motor 1166, a drive unit 1172 for driving sensors including an original size sensor 1169, switches and solenoids 1170. The scanner CPU 1160 is also connected to and controls an A/D converter 1176 for processing image information from a photoelectric transducer 1111, a resolution changer 1178, a shading corrector 1176, an image quality improver 1180 and binarizing circuit 1182.

Now, the page memory 1302, the IC card and the nonvolatile RAM for storing the maintenance program constituting the feature of the present invention will be explained with reference to FIG. 19. The page memory 1302 includes a memory means (page memory) for storing image data temporarily, an address controller 1306 for generating an address of the page memory 1323, an image bus 1320 for transferring data between the devices in the page memory 1302, a data control means 1307 for controlling the data transfer which may be made between the page memory 1323 and the other devices through the image bus 1320, an image data I/F means 1308 providing an interface for transferring the image data to and from the basic unit 1301 through the basic unit image interface 1317, a resolution changer/binary rotation means 1325 for changing the image data resolution to that of another device to which the image data is transmitted, changing the image data received from a device of a different resolution into the resolution of the printer 1315 of the basic unit 1301 or rotating the binary image data by 90 degrees, a compression/expansion means 1324 for compressing the image data input for transmission or storage devices using the image data in compressed form such as a facsimile or an optical disk or decompressing into a visible form the compressed image data through the printer 1315, and a multi-valued rotation memory used when the image data output is rotated by +90 or −90 degrees. The image data I/F means 1308, which is connected to a network, is for transmitting information input thereto through the scanner of the D-PPC to other devices or receiving the information transmitted from other devices and transmitting them to the printer.

The basic unit includes a nonvolatile RAM 64 connected to the basic unit bus system, an IC card interface having an IC card insertion hole 2 and an IC card 6. These devices are for storing the maintenance program of the present invention, and are connected through the data bus, the image data I/F 1308 and the communication line to an external server 1331 or other D-PPC 1330, from which the maintenance program, etc. can be received.

The maintenance program is supplied from an external source such as the D-PPC described above according to the invention in the manner mentioned below.

First, the D-PPC, which has the function of communicating the image information in binary (or other multi-digit) form, is applicable in a network system as shown in FIG. 19. In such a case, the text data prepared at a PC terminal are sent to the D-PPC and printed out. Conversely, an image of the original read by the D-PPC may be stored in a file server or in the HDD of the PC. The whole system having such functions is managed by the server 1331 through the communication line 1326.

Now, the procedure for processing the maintenance program sent from the server constituting the feature of the invention will be explained with reference to the flowcharts of FIGS. 17A, 17B and 17C. The flowcharts of FIGS. 17A, 17B and 17C represent the first, second and third embodiments, respectively, each having the function of fetching a new processing program according to the invention.

Figure 17A:
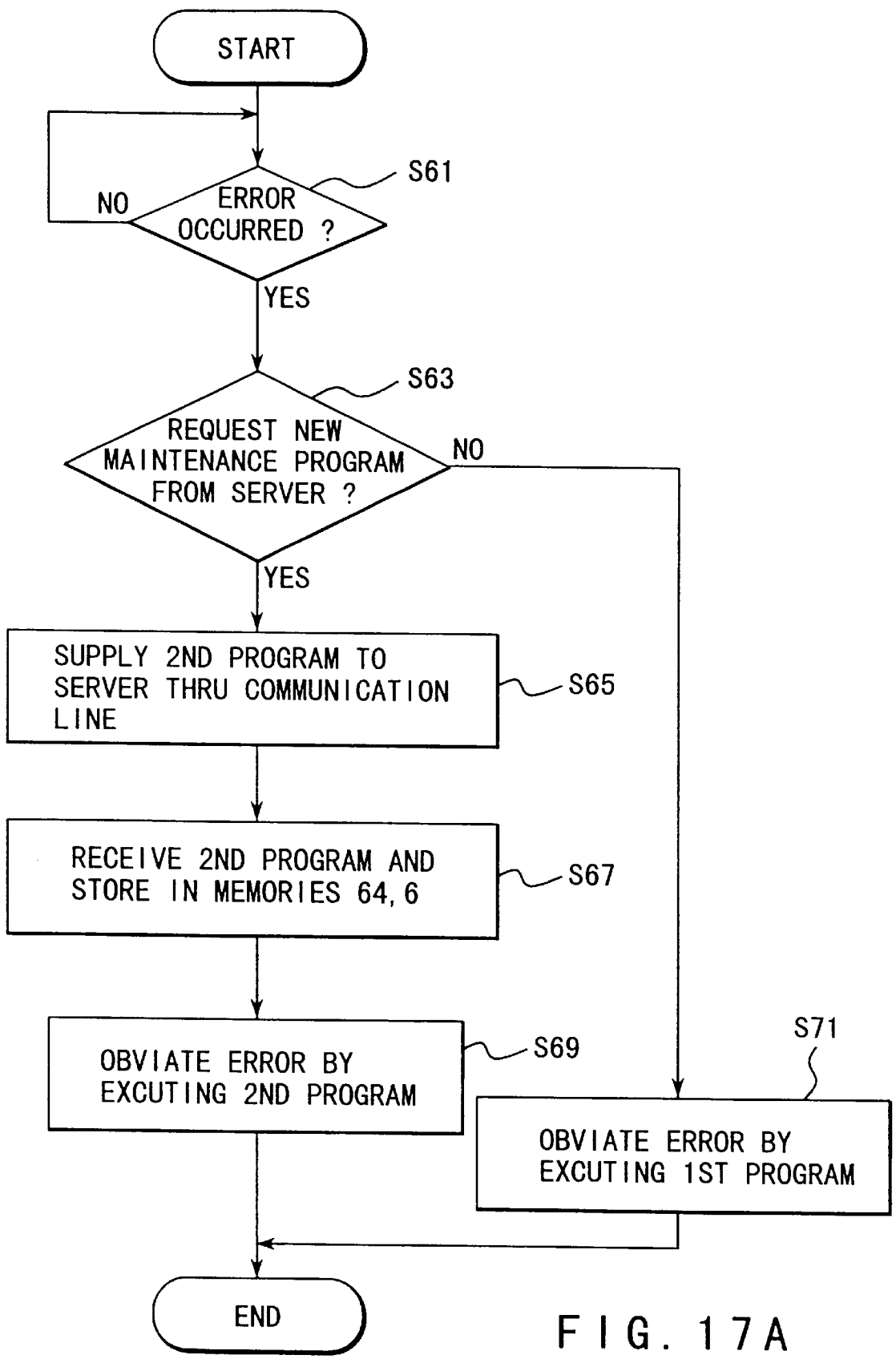
FIG. 17A is a flowchart showing the function of incorporating a new processing program according to the first embodiment constituting the feature of the invention.

In the first embodiment shown in FIG. 17A, in the case where some error occurs on the D-PPC (S61) and in the case where a program is not requested (S63), the program stored in the memory of the D-PPC is executed by the CPU in the D-PPC thereby to obviate the error (S71).

In the case where an error is processed according to the program sent from the server 1331, a request for the maintenance program is sent through the network together with the contents and history of the particular error (S63). In the process, however, the D-PPC makes no decision on the the type of program to be requested.

The server 1331 totalizes and analyzes the error information sent from the D-PPC, and predicts an error likely to occur in the D-PPC or analyzes the error tendency (features) of the D-PPC. As a result of analyzing the error information from the D-PPC, the server selects an anti-error program corresponding to the error tendency of the D-PPC and transmits this program to the D-PPC.

The D-PPC receives and stores this anti-error program in the memory (S67). The CPU of the D-PPC processes the error according to this program (S69).

Figure 17B:
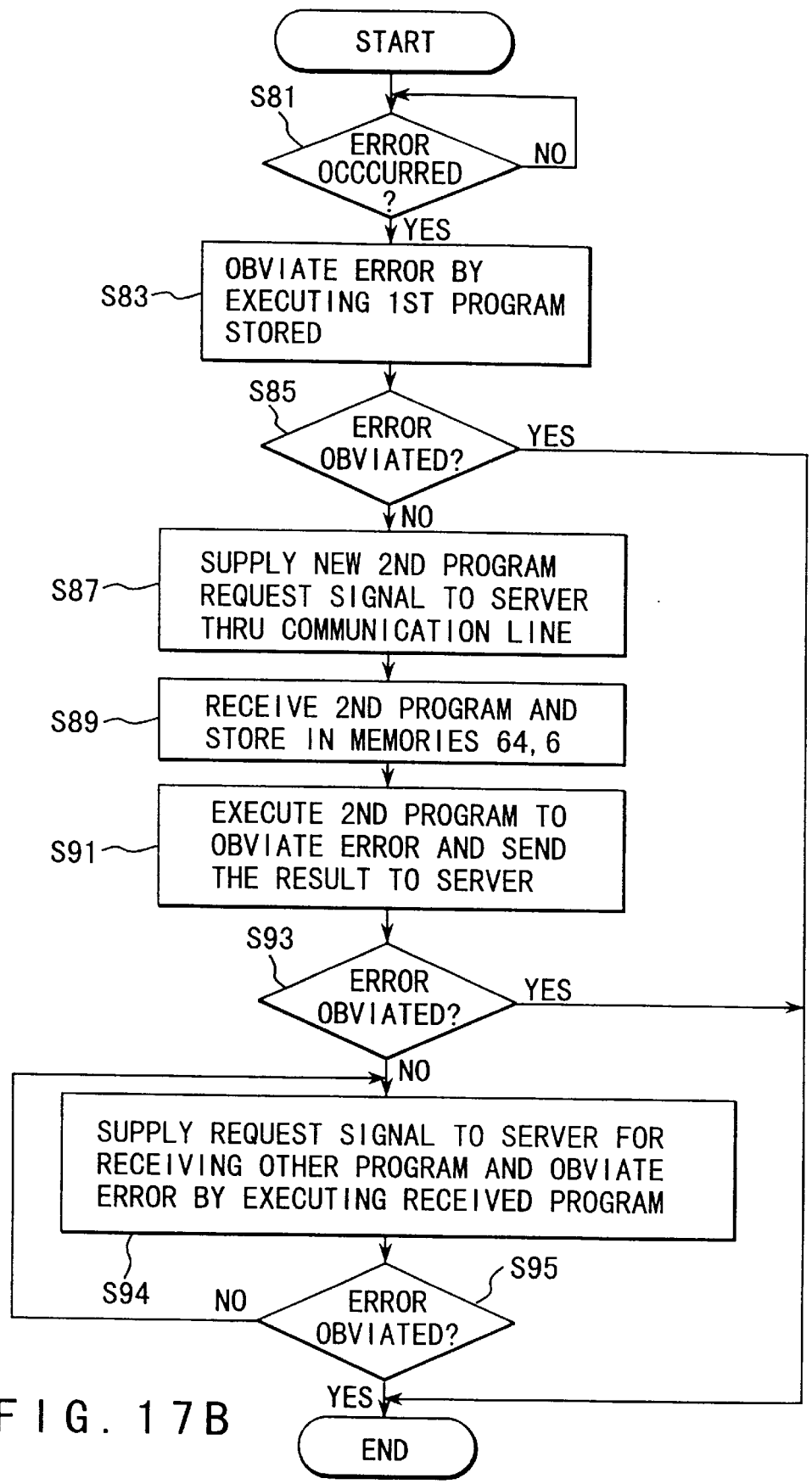
FIG. 17B is a flowchart according to a second embodiment showing the feature of the invention.

Further, according to the second embodiment shown in FIG. 17B, in the case where an error or other fault occurs on the D-PPC (S81), for example, the error is corrected by the CPU in the D-PPC according to the first stored program (S83). At the same time, the content and history of the particular error is transmitted to a server through the network. In the case where the error cannot be obviated by the first program, a request signal is issued requesting a second program (S85).

The server 1331 totalizes and analyzes the error information sent from the D-PPC, and predicts the error which is likely to occur on the D-PPC or analyzes the error tendency (feature) of the D-PPC. Further, the server, after analyzing the error information to meet the request signal from the D-PPC, selects an anti-error program corresponding to the error tendency of the D-PPC and sends the program to the D-PPC.

The D-PPC that has received the anti-error program (second program), on the other hand, stores the program in memory (S89).

In the process, if the memory area is enlarged by mounting an IC card or the like, many programs from the server can be stored very preferably for embodying the invention.

Furthermore, the error is processed by the CPU of the D-PPC on the basis of the program sent thereto (S91). When the error is solved, the result is transmitted to the server (S91). If the error cannot be solved by the program received, the fact is notified to the server (S93, S94). As a result, the server selects another optimum anti-error program on the basis of the result thus received, and transmits the program thus selected to the D-PPC.

In this way, a succession of processing programs for coping with errors are sent from the server 1331 to the D-PPC. The errors thus can be processed always by a program meeting the latest error tendency (S93, S95). By doing so, the best maintenance process can be automatically realized each time an error occurs without referring to the user for his/her decision.

According to the first and second embodiments, the server makes an overall decision on the error information and supplies the D-PPC with what seems to be an optimum maintenance program. The selection and decision on an optimum program, however, may alternatively be made by the D-PPC, as is done in the third embodiment.

Figure 17C:
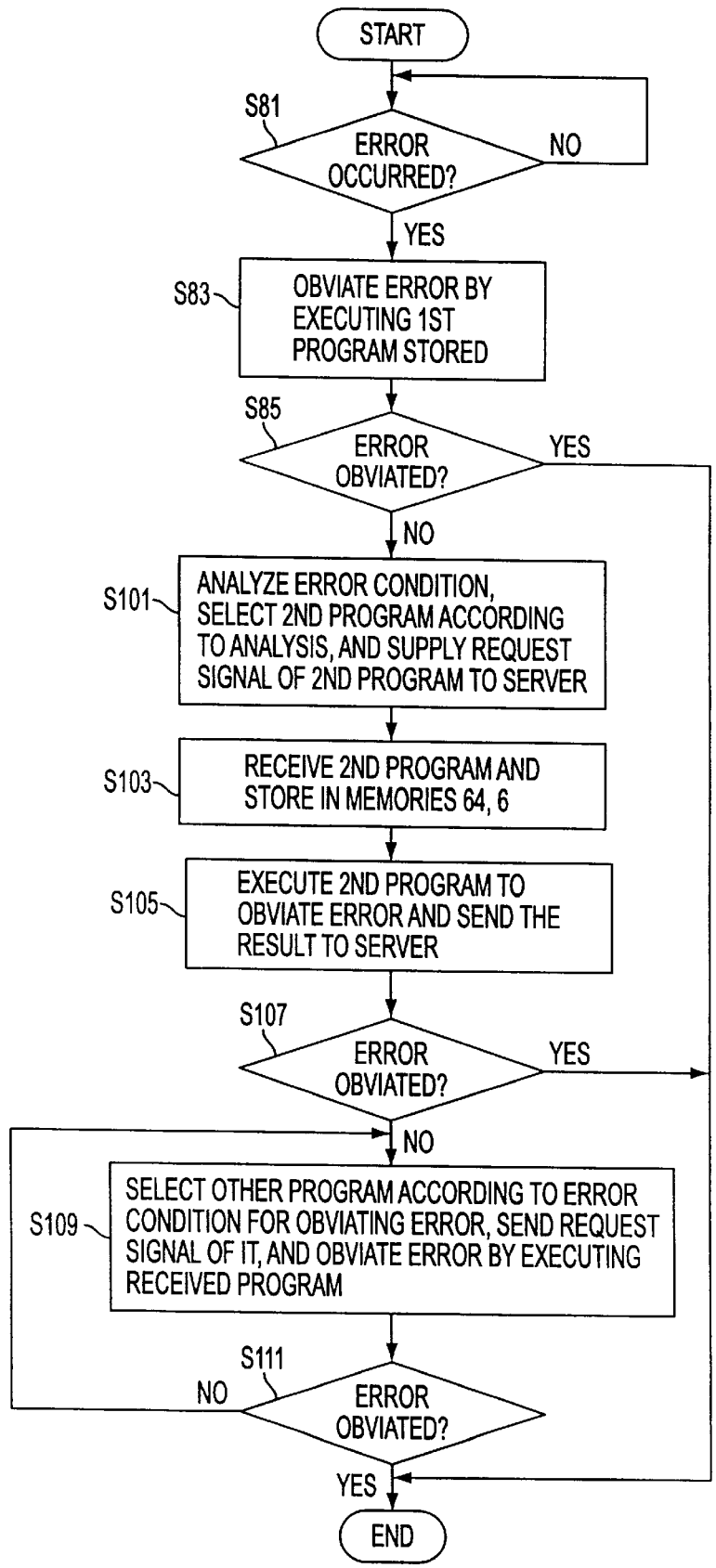
FIG. 17C is a flowchart according to a third embodiment showing the feature of the invention.

More specifically, according to the third embodiment shown in FIG. 17C, in the case where an error cannot be obviated by a program stored in the D-PPC before shipment (S81, S83, S85), the contents of the error are analyzed on the basis of the information supplied from a sensor or the like and a program considered necessary is specified. A signal requesting such a program is transmitted to the server (S101). For this purpose, a list of candidate programs may be predetermined or may be supplied by the server and stored in the D-PPC.

Further, the program thus supplied is stored (S103), and executed to obviate the error. The result of obviating the error in this way is reported to the server (S105).

In the case where an error cannot be corrected, a request for and automatic execution of a new program is repeated as in the second embodiment (S107, S109, S111).

According to a fourth embodiment, instead of notifying the server from the D-PPC at the time of occurrence of an error as in the aforementioned embodiments, the server may make an inquiry of error information (error data accumulated in the D-PPC) or error tendency as determined in the D-PPC at predetermined regular timings on the basis of the clock in the server. In response to this request, the D-PPC supplies the server with the error information from time to time, and if required, requests an appropriate program. As a result, the server can be kept informed of the error conditions of the D-PPC, thereby making possible rapid, accurate error analysis and selection and supply of a program.

It will thus be understood from the foregoing detailed description that according to the present invention, there is provided an image forming apparatus, in which a program for changing the data collection parameters from time to time for estimating the consumption of a specified part according to the prevailing conditions or a maintenance program for obviating an error can be added or changed without changing the hardware or the program for controlling the apparatus proper.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming apparatus comprising;
   an image forming device which reads an image of an original and forms the image on an image forming medium;
   a detecting device which detects a status of the image forming device;
   a first memory for storing a control program for controlling the image forming device;
   a communication device which requests a maintenance program for maintaining the image forming device to an external device when the detected status includes an error of the image forming device, and receives the maintenance program from the external device;
   a second memory for storing the maintenance program received by the communication device;
   a processing unit which controls the image forming device based on the control program and the maintenance program so as to correct the error when the image forming device is in the status that includes the error;
   a requesting device for requesting another program different from the maintenance program in case when the detected status of the image forming apparatus indicates an error of the image forming apparatus and cannot be obviated through a process performed by the processing unit based on the control and maintenance programs;
   a second control unit for controlling the image forming apparatus based on the another program supplied in accordance with the request from the requesting device; and
   a repeating device for repetitively performing the operations of the requesting device and the control unit of different programs from the control, maintenance and another programs until the error is obviated.

2. An image forming apparatus according to claim 1, wherein the communication device and the requesting device include:
   a selecting device for selecting a proper program based on the status detected by the detecting device and supplying a request signal to the external device to request the selected program.

3. A method of maintenance of the image forming apparatus comprising the steps of:
   detecting a status of the image forming apparatus;
   storing a first program for controlling the image forming apparatus;
   requesting a second program different from the first program for controlling the image forming apparatus when the status detected by the detecting step indicating an error in the image forming apparatus;
   receiving the second program from an external device in accordance with the request of the requesting step and storing the second program, when the image forming apparatus is in the status indicating the errors detected by the detecting device;
   controlling the image forming apparatus based on the first and second program, when the image forming apparatus is in the status indicating the errors detected by the detecting device;
   requesting another program different from the second program when the apparatus status is an error of the image forming apparatus and cannot be obviated through a process performed by the controlling step based on the first and second programs;
   controlling the image forming apparatus based on a third program supplied in accordance with the request from the second requesting step; and
   repetitively performing operations of the second requesting step and the second controlling step of different programs from the first, second and third programs until the error is obviated.

4. A method according to claim 3, wherein the first and second requesting steps includes:
   step of selecting a proper program based on the status detected by the detecting step and supplying a request signal to the external device to request the selected program.

5. An image forming apparatus comprising:
   an image forming device which reads an image of an original and forms the image on an image forming medium;
   a detecting device which detects a status of the image forming device;
   a first memory for storing a control program for controlling the image forming device;

a communication device which requests a maintenance program for maintaining the image forming device to an external device when the detected status includes an error of the image forming device, and receives the maintenance program from the external device;

a second memory for storing the maintenance program received by the communication device;

a processing unit which controls the image forming device based on the control program and the maintenance program so as to correct the error when the image forming device is in the status that includes the error;

a converting device to convert the image of the original into a digital signal and to form the image on the image-forming medium based on the digital signal;

a requesting device for requesting another program different from the maintenance program in case when the detected status of the image forming apparatus indicates an error of the image forming apparatus and cannot be obviated through a process performed by the processing unit based on the control and maintenance programs;

a second control unit for controlling the image forming apparatus based on the control program supplied in accordance with the request from the requesting device; and a repeating device for repetitively performing the operations of the requesting device and the control unit of different programs from the control, maintenance and another program until the error is obviated.

* * * * *